(12) United States Patent
Matsuda

(10) Patent No.: US 8,689,920 B2
(45) Date of Patent: Apr. 8, 2014

(54) TRACTION CONTROL SYSTEM AND METHOD OF SUPPRESSING DRIVING POWER

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 591 days.

(21) Appl. No.: 12/980,265

(22) Filed: Dec. 28, 2010

(65) Prior Publication Data

US 2011/0155100 A1 Jun. 30, 2011

(30) Foreign Application Priority Data

Dec. 28, 2009 (JP) .................................. 2009-297975
Dec. 29, 2009 (JP) .................................. 2009-299122

(51) Int. Cl.
*B60K 28/16* (2006.01)

(52) U.S. Cl.
USPC .................. 180/197; 701/75; 701/85; 701/90

(58) Field of Classification Search
USPC ............... 180/197; 701/74, 75, 82, 84, 85, 90
See application file for complete search history.

(56) References Cited

U.S. PATENT DOCUMENTS

| 5,092,420 | A | * | 3/1992 | Sugawara et al. ............. 180/197 |
| 5,224,043 | A | * | 6/1993 | Tamura et al. ................... 701/86 |
| 5,428,539 | A | * | 6/1995 | Kawamura et al. ............. 701/84 |
| 5,459,661 | A | * | 10/1995 | Yagi et al. ....................... 701/85 |
| 5,519,617 | A | * | 5/1996 | Hughes et al. ................... 701/84 |
| 5,669,351 | A | * | 9/1997 | Shirai et al. .............. 123/339.21 |
| 5,850,887 | A | * | 12/1998 | Nakashima et al. .......... 180/197 |
| 6,182,002 | B1 | * | 1/2001 | Bauerle et al. ................... 701/82 |
| 7,894,970 | B2 | * | 2/2011 | Fujita et al. ...................... 701/90 |
| 7,957,880 | B2 | * | 6/2011 | Watabe et al. ................... 701/90 |
| 2007/0179696 | A1 | * | 8/2007 | Schoeggl .......................... 701/69 |
| 2009/0326777 | A1 | * | 12/2009 | Oshima et al. .................. 701/83 |
| 2009/0326779 | A1 | * | 12/2009 | Oshima et al. .................. 701/86 |

FOREIGN PATENT DOCUMENTS

| EP | 0334370 A2 | 9/1989 |
| JP | 1290934 A | 11/1989 |
| JP | 03202641 A | 9/1991 |

(Continued)

OTHER PUBLICATIONS

Japanese Patent Office, Notice of Reasons for Rejection of Japanese Patent Application No. 2009-297975, Jul. 23, 2013, 5 pages.

*Primary Examiner* — Stephen K Cronin
*Assistant Examiner* — Joseph Dallo
(74) *Attorney, Agent, or Firm* — Alleman Hall McCoy Russell & Tuttle LLP

(57) ABSTRACT

A traction control system comprises a detector configured to detect a monitored spin value corresponding to a spin amount of a drive wheel in a vehicle; a condition determiner configured to determine whether or not the monitored spin value detected by the detector meets a driving power suppressing condition; and a controller configured to execute a traction control for reducing a driving power of the drive wheel based on the determination; the condition determiner being configured to set the driving power suppressing condition variably based on at least one of a variable parameter relating to a rotation number difference which is variable according to a change rate of a rotation number difference between the drive wheel and a driven wheel, and a variable parameter relating to rotation of a drive system which is variable according to a rotation change rate of the drive system for driving the drive wheel.

20 Claims, 16 Drawing Sheets

(56) References Cited

FOREIGN PATENT DOCUMENTS

| JP | 05149157 | A |   | 6/1993 |           |
|----|----------|---|---|--------|-----------|
| JP | 06159109 | A |   | 6/1994 |           |
| JP | 07-103009 |  |   | 4/1995 |           |
| JP | 2000052804 | A | * | 2/2000 | ............ B60K 31/00 |
| JP | 2002195067 | A |   | 7/2002 |           |
| JP | 2008115715 | A |   | 5/2008 |           |
| JP | 2009299668 | A |   | 12/2009 |          |

* cited by examiner

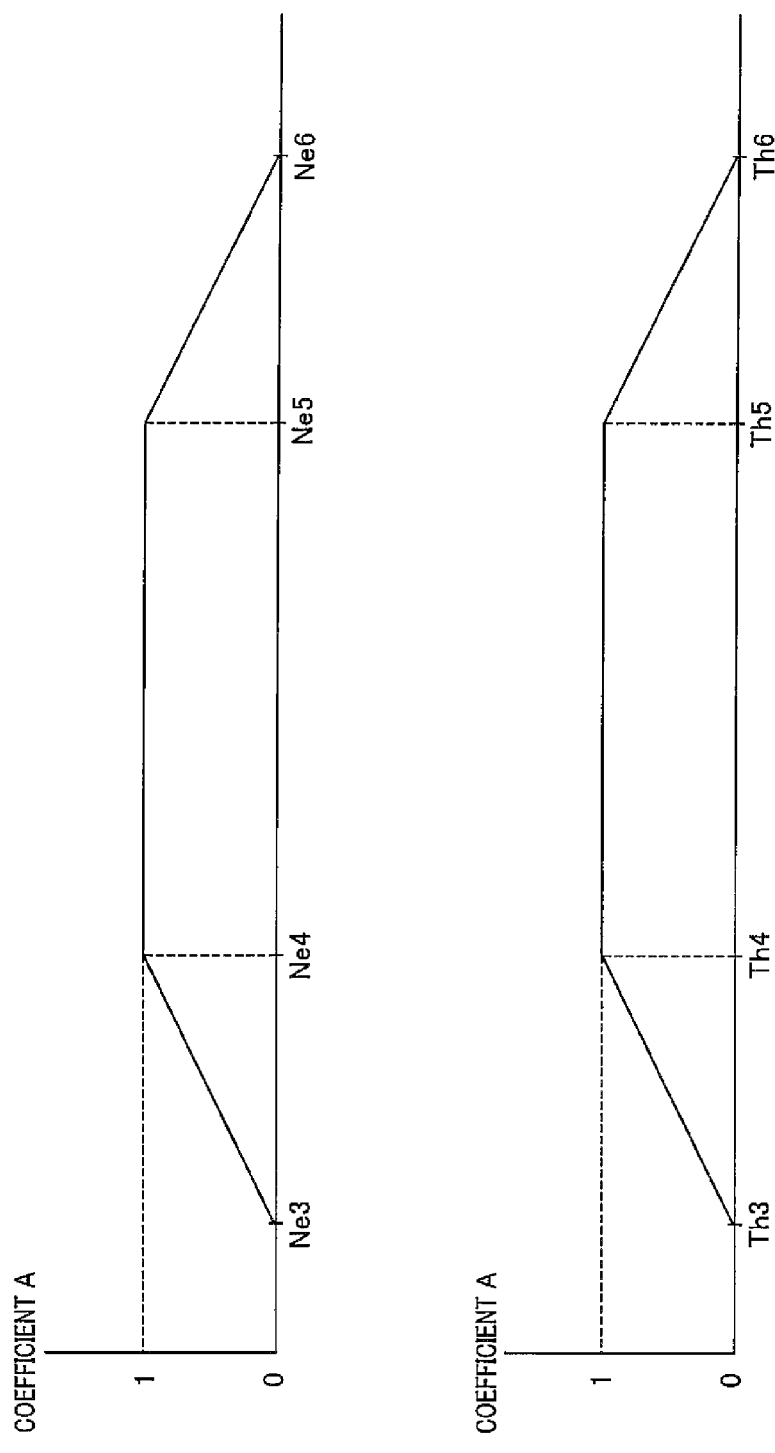

TRACTION CONTROL SYSTEM AND METHOD OF SUPPRESSING DRIVING POWER

BACKGROUND OF THE INVENTION

1. Field of the Invention

The present invention relates to a traction control system configured to control a driving power applied to a drive wheel according to a degree to which the drive wheel spins.

2. Description of the Related Art

Japanese Laid-Open Patent Application Publication No. Hei. 7-103009 discloses a traction control system in a vehicle, configured to reduce an engine driving power to restore a gripping force of a drive wheel with respect to a road surface when an amount of a slip of the drive wheel with respect to the road surface exceeds a predetermined value. This control system is configured to execute a traction control for reducing the driving power in such a manner that an ignition timing of an engine is retarded with respect to an optimal timing when a monitored value (e.g., increasing rate of an engine speed) exceeds a predetermined value.

In some cases, the driving power of the drive wheel is favorably maintained or increased, even when the monitored value exceeds the predetermined value and the traction control is executed. However, in the conventional traction control system, when the monitored value exceeds the predetermined value, the traction control is executed to restrict the driving power of the drive wheel irrespective of a gripping state of the drive wheel. Thus, the traction control is executed undesirably.

If the ignition timing of the engine is retarded, an imperfect combustion occurs and a fuel gas remains in a cylinder. The remaining fuel gas flows to a catalyst provided inside an engine component such as a muffler, through an exhaust pipe along with other exhaust gas, and is combusted in the catalyst. If the fuel gas has an uneven concentration in the catalyst, a temperature of the catalyst rises locally excessively, which leads to deterioration of the catalyst.

SUMMARY OF THE INVENTION

An object of the present invention is to provide a traction control system capable of preventing a traction control from being executed undesirably.

Another object of the present invention is to provide a traction control system capable of suppressing deterioration of a catalyst provided in an engine component such as a muffler.

According to the present invention, a traction control system comprises a detector configured to detect a monitored spin value corresponding to a spin amount of a drive wheel in a vehicle; a condition determiner configured to determine whether or not the monitored spin value detected by the detector meets a driving power suppressing condition; and a controller configured to execute a traction control for reducing a driving power of the drive wheel based on determination made by the condition determiner; the condition determiner being configured to set the driving power suppressing condition variably based on at least one of a variable parameter relating to a rotation number difference which is variable according to a change rate of a rotation number difference between the drive wheel and a driven wheel, and a variable parameter relating to a rotation of a drive system which is variable according to a rotation change rate of the drive system for driving the drive wheel.

In accordance with this configuration, the driving power suppressing condition is set variably based on at least one of the variable parameter variable according to the change rate of the rotation number difference between the drive wheel and the driven wheel, and the variable parameter that varies according to the change rate of the rotation of the drive system for driving the drive wheel. In other words, the driving power suppressing condition can be set flexibly to a condition according to a predicted gripping state with reference to the variable parameter. This makes it possible to execute the traction control while predicting the gripping state of the drive wheel. For example, in a case where the change rate is high, the gripping state of the drive wheel is more likely to get worse, and therefore, the driving power suppressing condition is changed so that the traction control will start as promptly as possible. On the other hand, in a case where the change rate is low, the gripping state of the drive wheel is more likely to be improved, and therefore the driving power suppressing condition is changed so that the traction control will not start promptly. Thus, the traction control starts as promptly as possible when the gripping state of the drive wheel is more likely to get worse, while the traction control is inhibited from being executed undesirably when the gripping state is more likely to be improved. As a result, the traction control is executed as necessary.

The condition determiner may be configured to determine whether or not the monitored spin value detected by the detector meets a spin condition. The controller may be configured to execute a traction control for controlling ignition states of a plurality of cylinders in which ignition occurs in a predetermined order to reduce the driving power of the drive wheel when the condition determiner determines that the monitored spin value meets the spin condition. The cylinders whose ignition states are controlled are decided according to a predetermined control rule. The control rule may be set such that the ignition state of the same cylinder is not controlled a predetermined number of times or more in succession. In accordance with this configuration, it is possible to avoid a situation in which a fuel gas remaining in the cylinder because of control of the ignition state, is exhausted from the same cylinder continuously. Thus, the fuel gas exhausted to the catalyst does not concentrate in a localized region of the catalyst. Since an unevenness of the fuel gas concentration in the catalyst is lessened in this way, deterioration of the catalyst due to excess heating in the localized region of the catalyst can be avoided.

The above and further objects, features and advantages of the present invention will more fully be apparent from the following detailed description of preferred embodiments with accompanying drawings.

BRIEF DESCRIPTION OF THE DRAWINGS

FIG. 16A is a graph showing a relationship between a coefficient A and an engine speed, and FIG. 16B is a graph showing a relationship between a coefficient B and a throttle valve opening degree.

DETAILED DESCRIPTION OF THE EMBODIMENTS

Hereinafter, a motorcycle 1 including a traction control system 18 (18A-18E) according to Embodiment of the present invention will be described with reference to the drawings. The stated directions are referenced from the perspective of a driver straddling the motorcycle 1 unless otherwise explicitly noted. The traction control systems described below are merely exemplary embodiments of the present invention. The present invention is not limited to the embodiments but addition, deletion or alternation may be made without departing from the scope of the present invention.

[Motorcycle]

Figure 1:
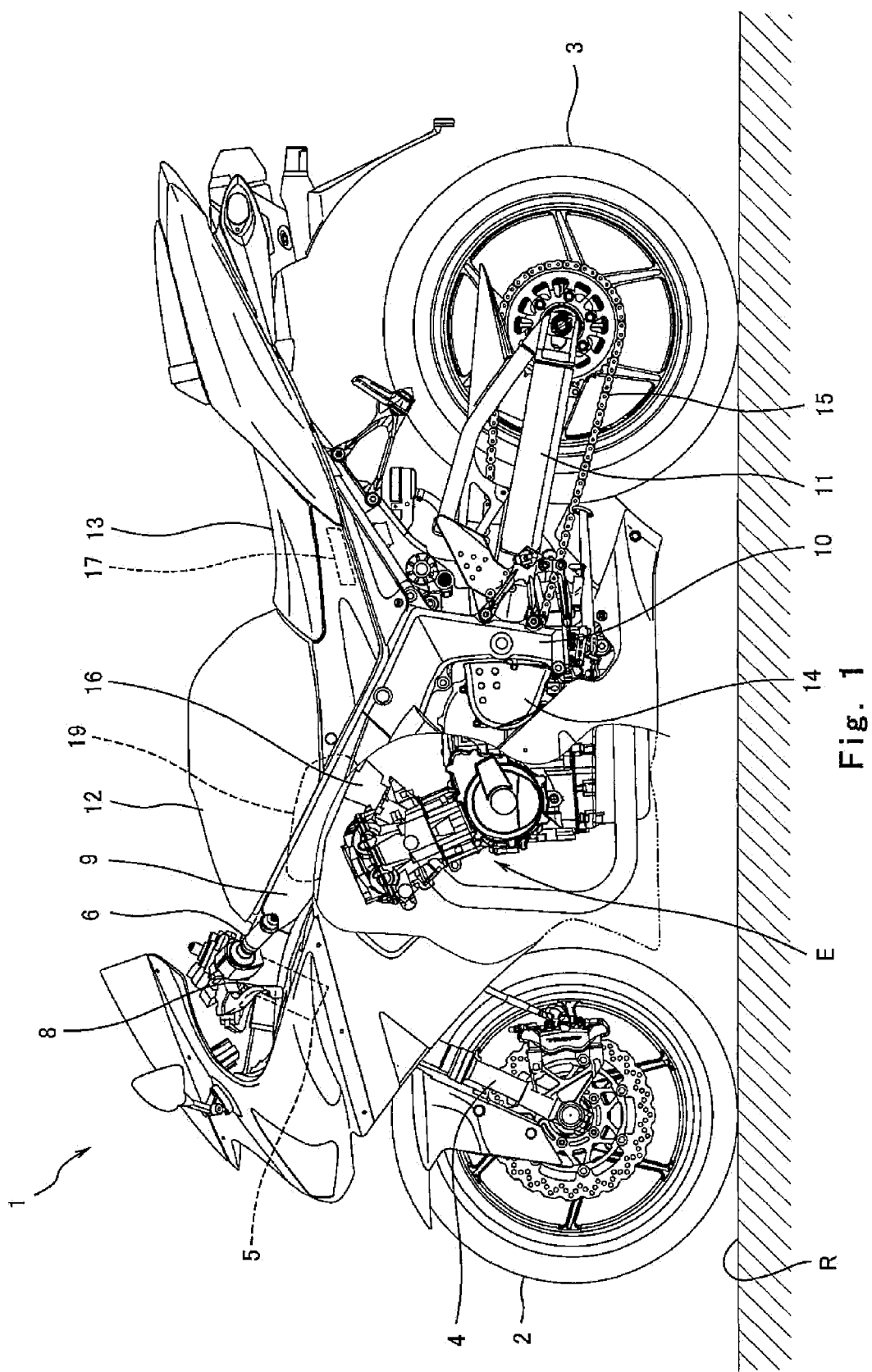
FIG. 1 is a left side view of a motorcycle including a traction control system according to Embodiment 1 of the present invention.

FIG. 1 is a left side view of the motorcycle 1 including the traction control system 18 according to Embodiment 1 of the present invention. Referring to FIG. 1, the motorcycle 1 (vehicle) includes a front wheel 2 and a rear wheel 3 which are configured to roll on a road surface R. The rear wheel 3 is a drive wheel, and the front wheel 2 is a driven wheel. The front wheel 2 is rotatably attached to a lower end portion of a front fork 4 extending substantially vertically. The front fork 4 is mounted to a steering shaft (not shown) via an upper bracket (not shown) provided at an upper end portion thereof and an under bracket provided under the upper bracket. The steering shaft is rotatably supported by a head pipe 5. A bar-type steering handle 6 extending rightward and leftward is attached to the upper bracket.

A throttle grip 7 (see FIG. 2) of the handle 6 which is gripped by the driver's right hand is a throttle input device which is rotated by the driver to operate a throttle device 16 as described later. A clutch lever 8 (clutch input device) is provided in front of the grip of the handle 6 which is gripped by the driver's left hand. A brake lever (not shown) is provided in front of the right grip. The driver rotates the handle 6 to turn the front wheel 2 around the steering shaft in a desired direction.

A pair of right and left main frame members 9 extend downward in a rearward direction from the head pipe 5. A pair of right and left pivot frame members 10 are coupled to rear portions of the main frame members 9, respectively. Swing arms 11 extend substantially in a longitudinal direction of the vehicle body and are pivotally attached at their front end portions to the pivot frame members 10, respectively. The rear wheel 3 is rotatably attached to the rear end portions of the swing arms 11. A fuel tank 12 is disposed behind the handle 6. A seat 13 straddled by the driver is provided behind the fuel tank 12.

Between the front wheel 2 and the rear wheel 3, an in-line four-cylinder engine E is mounted to the main frame members 9 and to the pivot frame members 10. A transmission 14 is coupled to the engine E. A driving power output from the transmission 14 is transmitted to the rear wheel 3 via a chain 15. The throttle device 16 is positioned inward relative to the main frame members 9 and coupled to intake ports (not shown) of the engine E. An air cleaner 19 is disposed below the fuel tank 12 and is coupled to an upstream side of the throttle device 16. The air cleaner 19 is configured to take in outside air using a ram pressure from forward. Exhaust pipes 51 extend from a front side of the engine E, under the engine E and to a right side of the rear wheel 3 and are coupled to exhaust ports (not shown) of the engine E. A muffler 52 (see FIG. 2) is provided at terminal ends of the exhaust pipes 51. A catalyst is contained in the muffler 52. In an inner space below the seat 13, an engine ECU (electronic control unit) which is an engine control unit configured to control the throttle device 16, an igniter 26 (see FIG. 2), an injector 31, and the like, is accommodated.

(Embodiment 1)

[Traction Control System]

Figure 2:
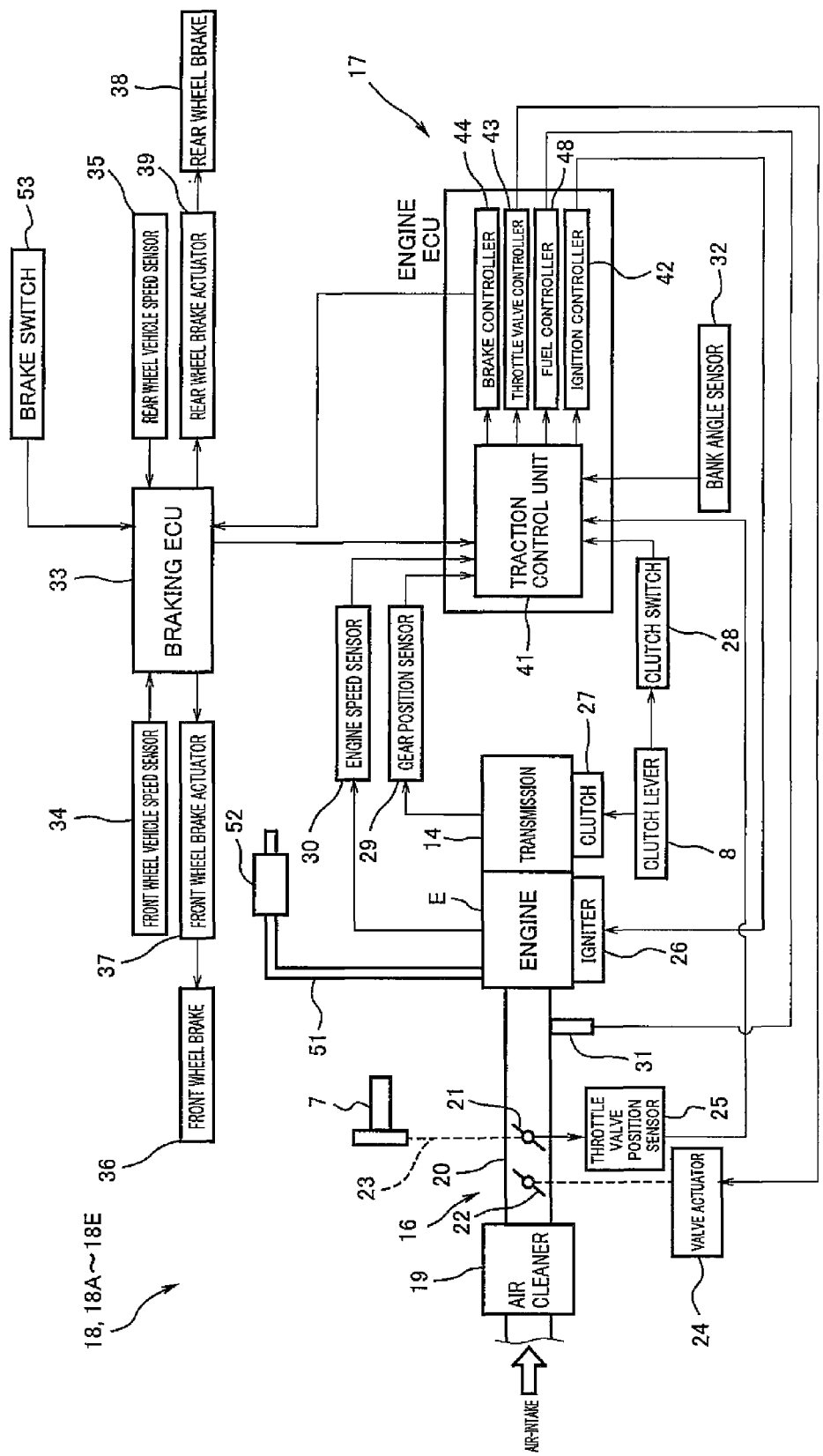
FIG. 2 is a block diagram showing an overall configuration of the traction control system in the motorcycle of FIG. 1.

FIG. 2 is a block diagram showing an overall configuration of the traction control system 18 in the motorcycle 1 of FIG. 1. Referring now to FIG. 2, the traction control system 18 includes the throttle device 16 provided between the air cleaner 19 and the engine E. The throttle device 16 includes an air-intake pipe 20, a main throttle valve 21 positioned at a downstream portion of the air-intake pipe 20, and a sub-throttle valve 22 positioned at an upstream portion of the air-intake pipe 20. The main throttle valve 21 is mechanically coupled to the throttle grip 7 via a throttle wire 23. According to the driver's operation of the throttle grip 7, the main throttle valve 21 opens and closes. The main throttle valve 21 is attached with a throttle valve position sensor 25 (throttle valve opening degree sensor) configured to detect an opening degree of the main throttle valve 21. Since the main throttle valve 21 is mechanically operative in response to the driver's operation of the throttle grip 7, the throttle valve position sensor 25 also serves as a throttle grip operation amount detector configured to indirectly detect the opening degree of the throttle grip 7.

The sub-throttle valve 22 is coupled to a valve actuator 24 including a motor controlled by the engine ECU 17. The valve actuator 24 causes the sub-throttle valve 22 to open and close. The throttle device 16 is provided with an injector 31 for injecting a fuel to an inside of an air-intake passage thereof. The engine E is provided with igniters 26 for igniting an air-fuel mixture in the four cylinders, respectively. The engine E is attached with an engine speed sensor 30 configured to detect an engine speed of the engine E. A transmission 14 is coupled to the engine E to change a speed of an engine driving power and transmit it to the rear wheel 3. The transmission 14 is provided with a clutch 27 configured to be engaged or disengaged to permit the driving power to be transmitted or inhibit the driving power from being transmitted.

The clutch 27 is disengaged by the driver's operation for gripping the clutch lever 8 to inhibit the driving power from being transmitted. The clutch lever 8 is provided with a clutch switch 28 (clutch operation detector) configured to detect whether or not the clutch lever 8 has been gripped by the driver. The transmission 14 is attached with a gear position sensor 29 configured to detect a transmission gear position set in the transmission 14. A brake lever is coupled to a front wheel brake 36 for braking the front wheel 2. The front wheel brake 36 is configured to brake the front wheel 2 by the driver's operation for gripping the brake lever. The brake lever is provided with a brake switch 53 configured to detect whether or not the brake lever has been gripped by the driver.

The traction control system 18 further includes a braking ECU 33 used in a known combined brake system. The braking ECU is configured to control a so-called CBS or a so-called ABS. A front wheel vehicle speed sensor 34 configured to detect a vehicle speed from a rotation number of the front wheel 2 and a rear wheel vehicle speed sensor 35 configured to detect a vehicle speed from a rotation number of the rear wheel 3, are coupled to the braking ECU 33. A front wheel brake actuator 37 configured to actuate the front wheel brake 36 and a rear wheel brake actuator 39 configured to actuate the rear wheel brake 38, are coupled to the braking ECU 33. The traction control system 18 further includes a bank angle sensor 32 configured to detect right and left bank angles of a vehicle body of the motorcycle 1.

The throttle valve position sensor 25, the clutch switch 28, the gear position sensor 29, the engine speed sensor 30, the bank angle sensor 32, and the braking ECU 33 are coupled to the engine ECU 17. The engine ECU 17 includes a traction control unit 41, an ignition controller 42, a fuel controller 48, a throttle valve controller 43 and a brake controller 44. As described later, the traction control unit 41 is configured to perform a calculation relating to the traction control based on signals received from the sensors 25, 29, 30, 32, and 33 and the switch 28. The ignition controller 42 is configured to control the igniter 26 based on a result of calculation performed in the traction control unit 41. The fuel controller 48 is configured to control the injector 31 based on a result of the calculation performed in the traction control unit 41. The throttle valve controller 43 is configured to drive the valve actuator 24 based on a result of the calculation performed in the traction control unit 41 to control the opening degree of the sub-throttle valve 22. The brake controller 44 is configured to transmit a brake actuation signal to the braking ECU 33 based on a result of the calculation performed in the traction control unit 41.

Figure 3:
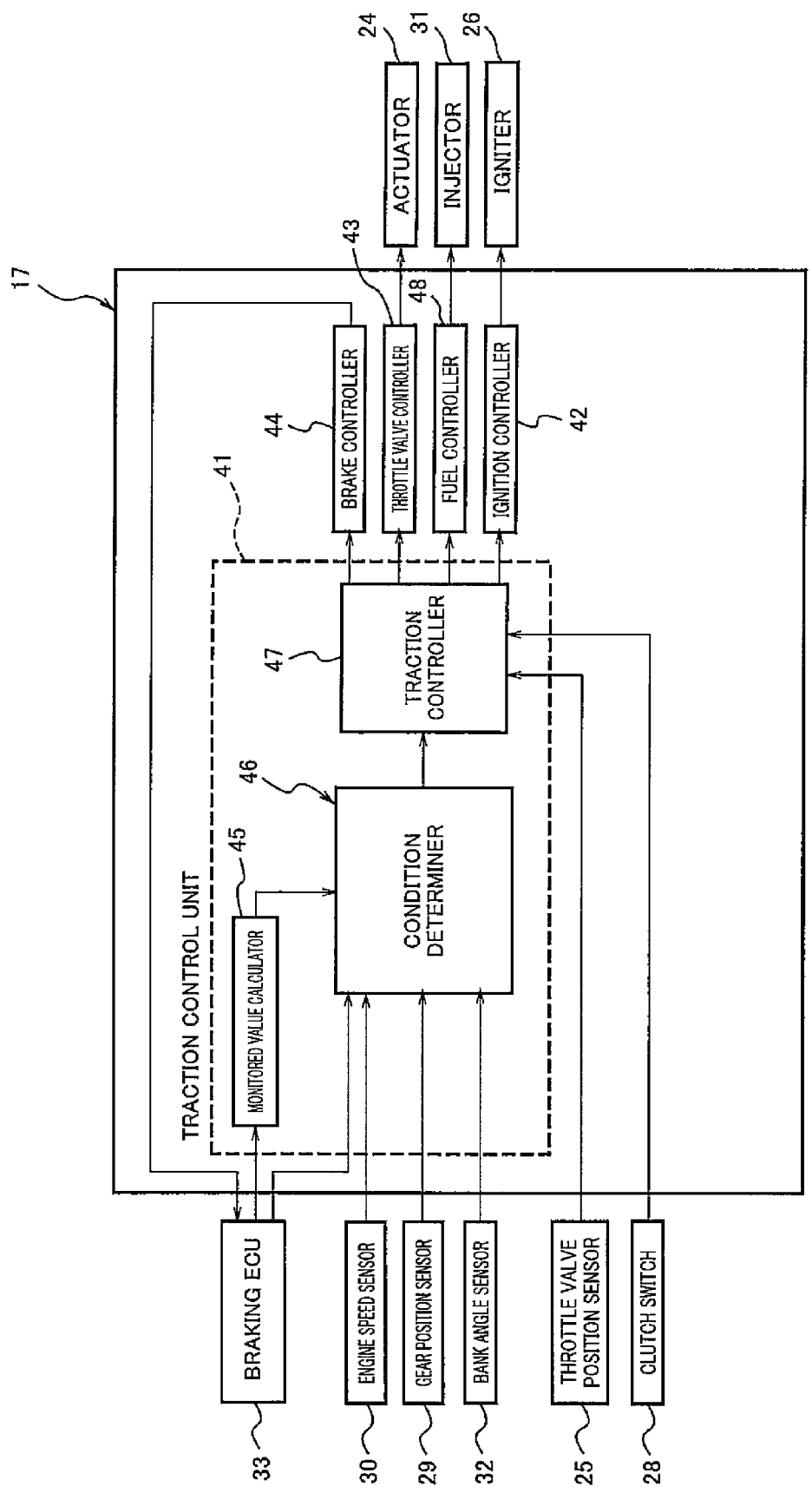
FIG. 3 is a block diagram showing main constituents in the traction control system of FIG. 2.

FIG. 3 is a block diagram showing main constituents in the engine ECU 17 in the traction control system 18 in FIG. 2. Referring to FIG. 3, as described above, the engine ECU 17 includes the traction control unit 41, the ignition controller 42, the fuel controller 48, the throttle valve controller 43 and the brake controller 44. The traction control unit 41 includes a monitored value calculator 45, a condition determiner 46 and a traction controller 47. The monitored value calculator 45 is configured to sequentially calculate a monitored spin value M according to a spin amount of the rear wheel 3 which is the drive wheel, based on information received from the braking ECU 33. The monitored spin value M is calculated according to, for example, a formula (1):

$$M = (V_R - V_F)V_R \quad (1)$$

where $V_F$ is a front wheel vehicle speed (circumferential speed) derived from the front wheel rotation number by the front wheel vehicle speed sensor 34, and $V_R$ is a rear wheel vehicle speed (circumferential speed) derived from the rear wheel rotation number by the rear wheel vehicle speed sensor 35. The formula (1) is used to calculate a slip ratio. The front wheel vehicle speed sensor 34, the rear wheel vehicle speed sensor 35, the braking ECU 33 and the monitored value calculator 45 constitute a detector configured to detect the monitored spin value M.

Although the slip ratio which is a value corresponding to a difference between the rotation number of the front wheel 2 and the rotation number of the rear wheel 3 is calculated sequentially as the monitored spin value M, the monitored spin value M is not limited to the formula (1), but may be a value according to the spin amount of the rear wheel 3 which is the drive wheel. For example, the monitored spin value M may be a slip ratio calculated according to another calculation formula, for example, a vehicle speed difference $(V_R - V_F)$ between the front wheel 2 and the rear wheel 3, a value $(V_R - V_F)/V_F$ which is obtained by dividing the vehicle speed difference by the vehicle speed $V_F$ of the front wheel 2, a difference $(R_R - R_F)$ between the rotation number $R_F$ of the front wheel 2 and the rotation number $R_R$ of the rear wheel 3, or the associated value $(R_R - R_F)/R_R$. Furthermore, the monitored spin value M may be a change rate $\Delta(V_R - V_F)$ of a vehicle speed difference, a change rate $\Delta(R_R - R_F)$ of a rotation number difference, a difference $(R_R - V)$ between the rotation number $R_R$ of the rear wheel 3 and the vehicle speed V, a change rate $\Delta Ne$ of an engine speed Ne, a change rate $\Delta R_R$ of the rotation number of drive wheel, a change rate of a rotation number of a drive system (e.g., drive sprocket, driven sprocket, or intermediate shaft of the transmission) coupling the drive wheel to the engine E, a change rate of the slip ratio, etc. As used herein, the change rate is a value obtained by dividing a difference between two values measured for a predetermined time by the predetermined time.

The condition determiner 46 determines whether or not the monitored spin value M calculated as described above meets a first driving power suppressing condition and a second driving power suppressing condition. If it is determined that the monitored spin value M meets the first driving power suppressing condition and the second driving power suppressing condition, the condition determiner 46 determines that the rear wheel 3 is more likely to spin with respect to the road surface R undesirably and that the driving power should be reduced. The first driving power suppressing condition used as a reference to determine whether or not to reduce the driving power is given by a formula (2). In other words, it is determined whether or not the monitored spin value M meets the formula (2):

$$M \geq K1_{th} \times \Delta Th + K1_{Ne} \times \Delta Ne + K1_{sl} \times \Delta Slip + K1_{Acc} \times Acc + K1_{Ne} + K1_{th} + K1_{sl} + \alpha = \text{first variable threshold } M_1 \quad (2)$$

where Th, Ne, Slip, and Acc are state-relating values indicating states of the motorcycle 1. Th is the opening degree of the main throttle valve 21, and $\Delta Th$ is a change rate of the opening degree of the main throttle valve 21, in a predetermined time period. Ne is an engine speed (rotation number of the drive system), and $\Delta Ne$ is a change rate of the engine speed for a predetermined time period. Slip is the slip ratio (difference in rotation number between front and rear wheels, for example, Slip=$(V_R - V_F)/V_R$). $\Delta$Slip is a change rate of the slip ratio in a predetermined time period. Acc is a change rate of the vehicle speed V of the motorcycle 1 in a predetermined time period, i.e., acceleration. $\alpha$ is a predetermined constant. $\Delta$Th, $\Delta$Ne, $\Delta$Slip and Acc are variable parameters which are variable according to the change rates. These variable parameters are not necessarily the change rates but may be differences so long as they are variable according to the change rates. The same applies to the formulae illustrated below.

$K1_{th}$, $K1_{Ne}$, $K1_{Acc}$, and $K1_{sl}$ are weighting coefficients (factors) with respect to $\Delta$Th, $\Delta$Ne, $\Delta$Slip and Acc, respectively. $K1_{th}$, $K1_{Ne}$, $K1_{Acc}$, and $K1_{sl}$ are set according to the driving state of the motorcycle 1 and the engine running state, for example, at least one value from among the values of the throttle valve opening degree Th, the engine speed Ne, the slip ratio Slip, the vehicle speed V of the motorcycle 1, the bank angle, etc., which are detected by the sensors 25, 29, 30, 32 and 33. The condition determiner 46 contains a map relating to the weighting coefficients (factors) $K1_{th}$, $K1_{Ne}$, $K1_{Acc}$, and $K1_{sl}$. Each of the weighting coefficients $K1_{th}$, $K1_{Ne}$, $K1_{Acc}$, and $K1_{sl}$ is selected from the map or calculated, based on the information detected by the sensors 25, 29, 30, 32, and 33. Alternatively, the weighting coefficients $K1_{th}$, $K1_{Ne}$, $K1_{Acc}$, and $K1_{sl}$ may be set according to other driving states or other engine running state, for example, the transmission gear position set in the transmission 14, the speed $V_F$ of the front wheel 2, the speed $V_R$ of the rear wheel 3, a brake pressure, etc.

The second driving power suppressing condition is given by a formula (3) below. In other words, it is determined whether or not the monitored spin value M meets a formula (3):

$$M \geq K2_{th} \times \Delta Th + K2_{Ne} \times \Delta Ne + K2_{sl} \times \Delta Slip + K2_{Acc} \times Acc + K2_{Ne} + K2_{th} + K2_{sl} + \beta = \text{second variable threshold } M_2 \quad (3)$$

$\beta$ is a predetermined constant different from $\alpha$. The weighting coefficients (factors) $K2_{th}$, $K2_{Ne}$, $K2_{ACC}$, and $K2_{sl}$ are weighting coefficients (factors) with respect to $\Delta Th$, $\Delta Ne$, $\Delta Slip$ and Acc, respectively, and are different in value from $K1_{th}$, $K1_{Ne}$, $K1_{Acc}$, and $K1_{sl}$. $K2_{th}$, $K2_{Ne}$, $K2_{Acc}$, and $K2_{sl}$ are set according to, for example, at least one value from among the values of the throttle valve opening degree Th, the engine speed Ne, the slip ratio Slip, the vehicle speed V of the motorcycle 1, the bank angle, etc., which are detected by the sensors 25, 29, 30, 32 and 33. The condition determiner 46 contains a map relating to the weighting coefficients (factors) $K2_{th}$, $K2_{Ne}$, $K2_{Acc}$, and $K2_{sl}$. Each of the weighting coefficients $K2_{th}$, $K2_{Ne}$, $K2_{Acc}$, and $K2_{sl}$ is selected from the map or calculated, based on the information detected by the sensors 25, 29, 30, 32, and 33. Alternatively, the weighting coefficients $K2_{th}$, $K2_{Ne}$, $K2_{Acc}$, and $K2_{sl}$ may be set according to, for example, the transmission gear position set in the transmission 14, the speed $V_F$ of the front wheel 2, the speed $V_R$ of the rear wheel 3, the brake pressure, etc. Although in this embodiment, the weighting coefficients $K1_{th}$, $K1_{Ne}$, $K1_{Acc}$, and $K1_{sl}$ and the weighting coefficients $K2_{th}$, $K2_{Ne}$, $K2_{Acc}$, and $K2_{sl}$ which are used for the driving power suppressing conditions, are values decided according to the driving state of the motorcycle 1 or the engine running state, they may be predetermined fixed values irrespective of the driving state of the motorcycle 1 or the engine running state.

Thus, the first driving power suppressing condition is such that the monitored spin value M exceeds the first variable threshold $M_1$ and the second driving power suppressing condition is such that the monitored spin value M exceeds the second variable threshold $M_2$. The first variable threshold $M_1$ and the second variable threshold $M_2$ are thresholds set variably according to $\Delta Th$, $\Delta Ne$, $\Delta Slip$ and Acc, and their magnitude relationship is varied according to the weighting coefficients $K1_{th}$, $K1_{Ne}$, $K1_{Acc}$, and $K1_{sl}$ and the weighting coefficients $K2_{th}$, $K2_{Ne}$, $K2_{Acc}$, and $K2_{sl}$. This will be described with reference to FIG. 4.

Figure 4:
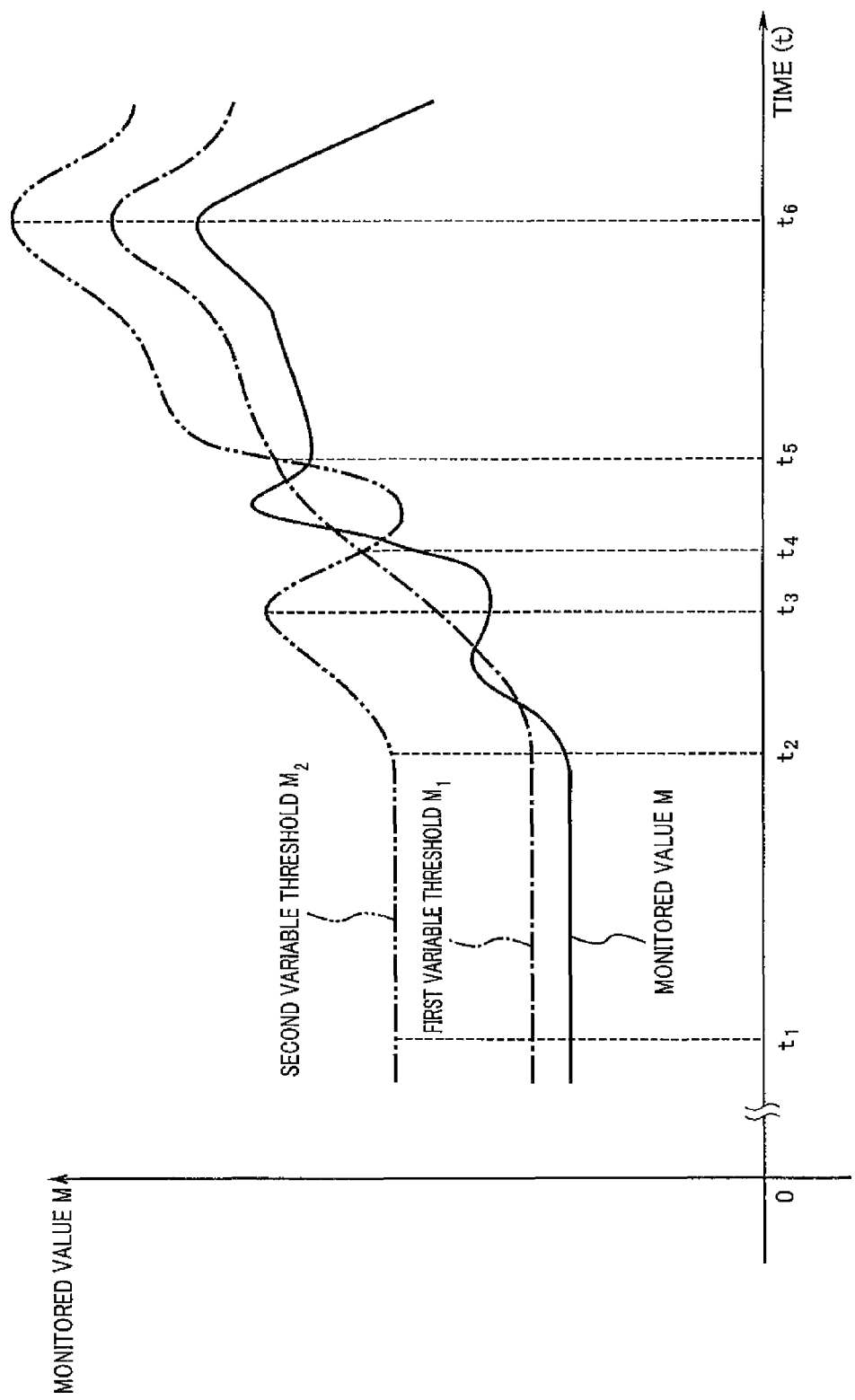
FIG. 4 is a graph showing time-lapse changes in a first driving power suppressing condition and a second driving power suppressing condition used in the traction control system.

In FIG. 4, a vertical axis indicates the monitored spin value M, the first variable threshold $M_1$, and the second variable threshold $M_2$ and a horizontal axis indicates a time. In a steady state, the first variable threshold $M_1$ is smaller than the second variable threshold $M_2$ (e.g., time $t_1 \sim t_2$). The weighting coefficients $K1_{th}$, $K1_{Ne}$, $K1_{Acc}$, $K1_{sl}$, $K2_{th}$, $K2_{Ne}$, $K2_{Acc}$, and $K2_{sl}$ are set such that the first variable threshold $M_1$ and the second variable threshold $M_2$ increase if the driver suddenly rotates the throttle grip 7, Th thereby rapidly changes, and thereby the change rate of $\Delta Th$ increases (e.g., time $t_3$). However, for example, if the engine speed rapidly increases and the change rate of the engine speed (or change rate of the slip ratio) increases (time $t_4$), the second variable threshold $M_2$ could be smaller than the first variable threshold $M_1$. Thereafter, when the change rate of the engine speed (or change rate of the slip ratio) decreases, the first variable threshold $M_1$ becomes smaller than the second variable threshold $M_2$ (e.g., after time $t_5$). As should be appreciated, the respective driving power suppressing conditions have derivation formulae different from each other and are set as independent conditions which do not interfere with each other. Therefore, the first variable threshold $M_1$ and the second variable threshold $M_2$ are not constant in magnitude relationship, but may be reversed in magnitude, according to cases. The driving power to be suppressed is made different between a case where the first driving power suppressing condition is met and a case where the second driving power suppressing condition is met. For example, in a case where both of the first driving power suppressing condition and the second driving power suppressing condition are met, one of these conditions may be prioritized. For example, the condition corresponding to a larger suppressed amount may be prioritized, or otherwise the condition corresponding to a smaller suppressed amount may be prioritized. In the present example, if both of these conditions are met, the second driving power suppressing condition is prioritized.

Regarding the relationship of the first driving power suppressing condition, the formula 2 is merely exemplary, but modified formula 2, for example, a formula in which the first variable threshold $M_1$ is shifted to a left side (e.g., monitored spin value M—first variable threshold $M_1 \geq 0$), a formula in which a left side and a right side are divided by a predetermined term (e.g., monitored spin value $M/(K1_{th} \times \Delta Th) \geq$ first variable threshold $M_1/(K1_{th} \times \Delta Th)$), or a formula in which the monitored spin value M is divided by the first variable threshold $M_1$ (e.g., monitored spin value M/first variable threshold $M_1 \geq 1$), may be used. The same occurs in the formula (3) corresponding to the second driving power suppressing condition. The formula 2 and the formula 3 do not contain all of the terms $\Delta Th$, $\Delta Ne$, $\Delta Slip$ and Acc but may contain at least one of the terms $\Delta Th$, $\Delta Ne$, $\Delta Slip$ and Acc. That is, the formulae of the first driving power suppressing condition and the second driving power suppressing condition may be given by a formula (4) and a formula (5):

$$M \geq K1_{Ne} \times \Delta Ne + \alpha = \text{first variable threshold } M_1 \quad (4)$$

$$M \geq K2_{Ne} \times \Delta Ne + \beta = \text{second variable threshold } M_2 \quad (5)$$

The formulae do not use the same variables, but may be, for example, formula (6) and a formula (7):

$$M \geq K1_{th} \times \Delta Th + K1_{Ne} \times \Delta Ne + K1_{sl} \times \Delta Slip + K1_{Acc} + \alpha = \text{first variable threshold } M_1 \quad (6)$$

$$M \geq K2_{th} \times \Delta Th + K2_{Ne} \times \Delta Ne + K2_{Acc} \times Acc + K2_{sl} + \beta = \text{second variable threshold } M_2 \quad (7)$$

The first variable threshold $M_1$ and the second variable threshold $M_2$ are not limited to the above mentioned state-relating values such as Th, Ne, Slip, Acc, etc., but may be variably set based on other state-relating values such as, whether or not a braking operation has been performed, whether or not a clutch operation has been operated, a rotational amount of the throttle grip 7, a steering angle, a bank angle of the vehicle body, etc., so long as they are set based on the values relating to the states of the motorcycle 1.

The condition determiner 46 is configured to determine whether or not the slip ratio is larger than a determination start value pre-stored. Since the monitored spin value M corresponds to the slip ratio in this embodiment, the condition determiner 46 makes the determination using the monitored value M calculated by the monitored value calculator 45. The determination start value is set according to the transmission gear position of the transmission 14. The condition determiner 46 is configured to set the determination start value based on the transmission gear position derived from the gear position sensor 29 and to compare the determination start value to the calculated slip ratio.

The condition determiner 46 is configured to determine whether or not a switch condition (switch determination condition) and a control termination determination condition are met. If it is determined that the switch condition is met, the condition determiner 46 determines that the rear wheel 3 is likely to spin significantly with respect to the road surface R, and the driving power should be reduced to a greater degree. If it is determined that the control termination determination condition is met, the condition determiner 46 determines that the monitored spin value M indicates a value which is beyond a scope of assumption, due to failure of the sensors 25, 29, 30, 32, 33, etc. The switch condition is, for example, such that that the monitored spin value M exceeds a predetermined constant $\gamma$. The control termination determination condition is, for example, such that the monitored spin value M exceeds a predetermined constant $\delta$. The constant $\gamma$ and the constant $\delta$ are larger than values of the first variable threshold $M_1$ and the second variable threshold $M_2$, and $\gamma < \delta$ is satisfied. The switch condition may be determined from the first driving power suppressing condition and the second driving power suppressing condition, instead of the constant $\gamma$.

The traction controller 47 may be configured to execute the traction control for reducing the driving power of the rear wheel 3 based on a result of the determination made by the condition determiner 46 as described later. In the traction control, the driving power to be reduced is changed according to the result of the determination. The traction control includes a first traction control, a second traction control, and a third traction control, according to the driving power to be reduced. The first traction control is executed when the first driving power suppressing condition is met. The second traction control is executed when the second driving power suppressing condition is met. The driving power is reduced more in the second traction control than in the first traction control. The driving power is reduced more in the third traction control than in the first traction control and the second traction control. The third traction control is executed when the switch condition is met.

In the traction control, the traction controller 47 decides values of a retard angle amount of the ignition timing, a fuel injection amount, a reduction amount of air-intake, an operation amount of the rear wheel brake actuator 39, etc., based on a result of the determination made by the condition determiner 46, and outputs these values as commands to corresponding ones of the ignition controller 42, the fuel controller 48, the throttle valve controller 43 and the brake controller 44. In accordance with the commands from the traction controller 47, the ignition controller 42 controls the igniter 26, the fuel controller 48 controls the injector 31, the throttle value controller 43 controls the valve actuator 24, and the brake controller 44 controls the rear wheel brake 38. Hereinafter, the traction control or the like will be described more specifically with reference to the flowchart of FIG. 5.

[Traction Control]

Figure 5:
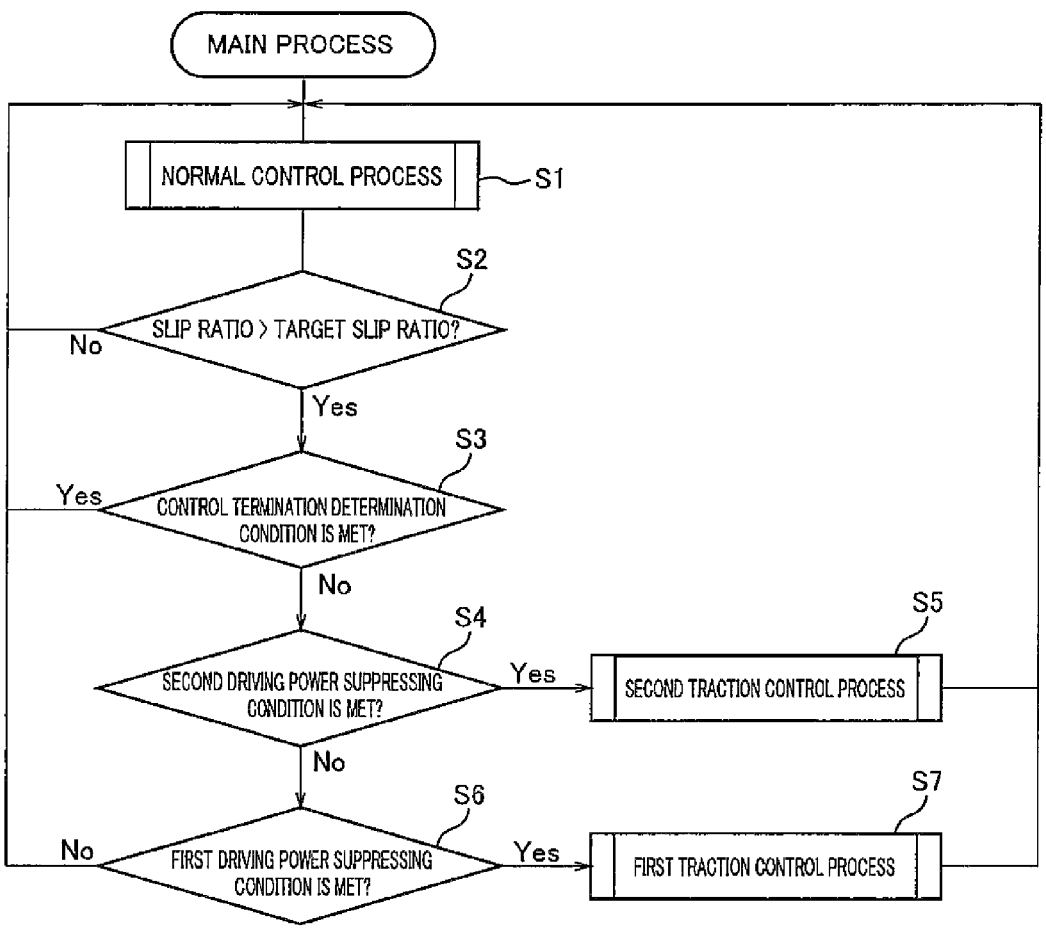
FIG. 5 is a flowchart showing a main process executed by an engine ECU.

Referring now to FIG. 5, upon a main power supply (not shown) of the motorcycle 1 being turned ON, the engine ECU 17 executes normal control (step S1). Then, the condition determiner 46 in the engine ECU 17 determines whether or not the slip ratio is larger than the determination start value (step S2). If it is determined that the slip ratio is smaller than the determination start value, it is determined that it is not necessary to execute the traction control, and the condition determiner 46 continues to determine whether or not the slip ratio is larger than the determination start value until the slip value becomes larger than the determination start value.

If it is determined that the slip value becomes larger than the determination start value, the condition determiner 46 determines whether or not the control termination determination condition is met to determine whether or not the monitored spin value M is beyond a scope of assumption, due to failure of the sensors 25, 29, 30, 32, 33, and other reason (step S3). If it is determined that the control termination determination condition is met, the traction control is inhibited and the normal control continues (step S1). On the other hand, if it is determined that the control termination determination condition is not met, the condition determiner 46 then determines whether or not the second driving power suppressing condition is met to determine whether or not the rear wheel 3 is likely to spin to a greater degree (step S4). If it is determined that the second driving power suppressing condition is met, the engine ECU 17 performs a second traction control process to execute the second traction control as described later (step S5).

If it is determined that the second driving power suppressing condition is not met, the condition determiner 46 then determines whether or not the first driving power suppressing condition is met to determine whether or not the rear wheel 3 is likely to spin (step S6). If it is determined that the first driving power suppressing condition is met, the engine ECU 17 performs the first traction control process to execute the first traction control (step S7). On the other hand, if it is determined that the first driving power suppressing condition is not met, it is determined that it is not necessary to execute the traction control and the normal control continues (step S1).

Figure 6:
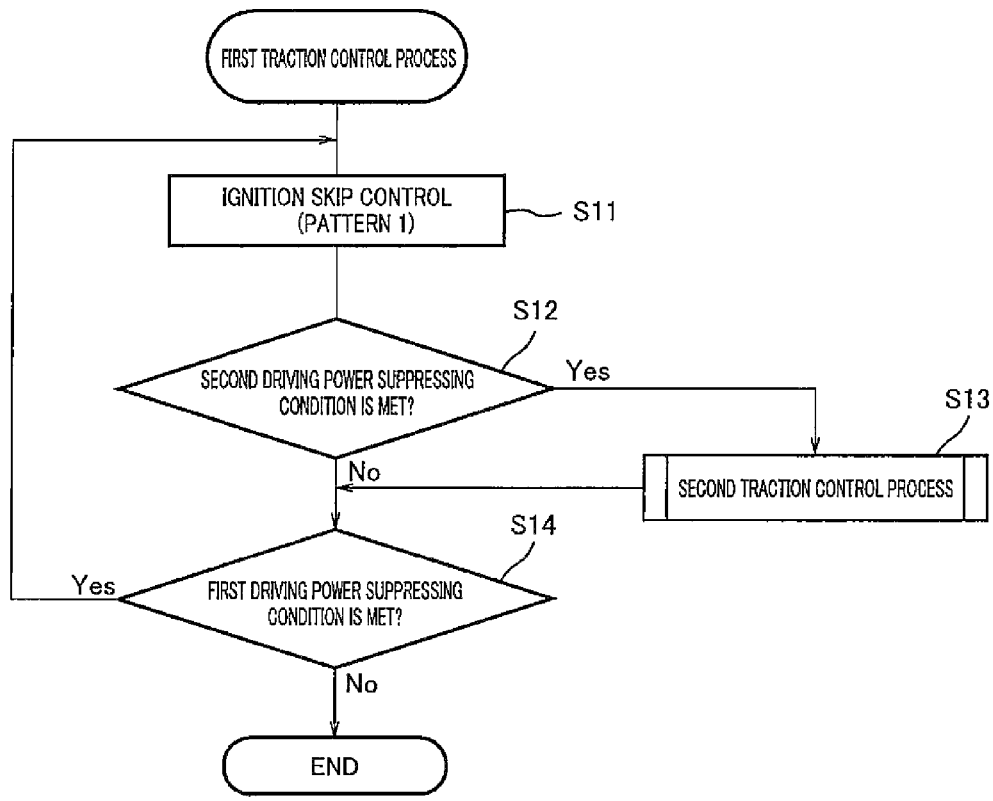
FIG. 6 is a flowchart showing a first traction control process executed by the engine ECU.
Figure 7:
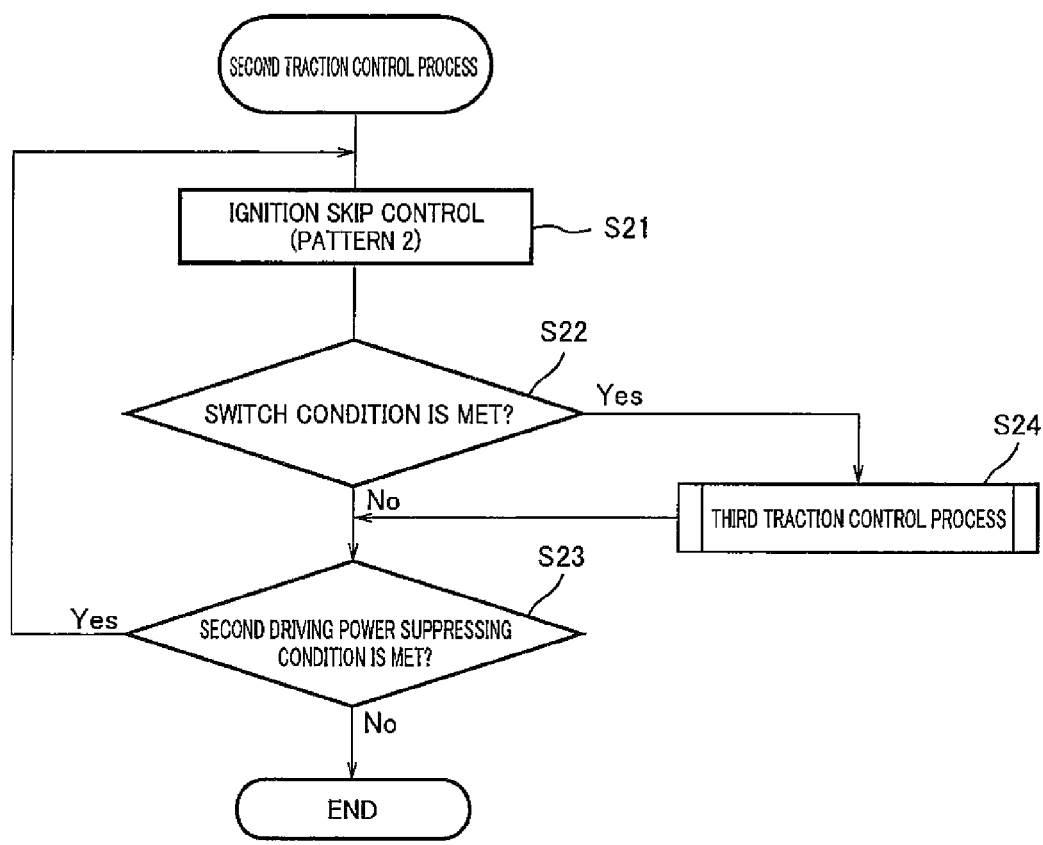
FIG. 7 is a flowchart showing a second traction control process executed by the engine ECU.

Hereinafter, the first traction control and the second traction control will be explained in detail with reference to FIGS. 6 and 7. The first traction control and the second control are similar in content. Accordingly, the first traction control will be described in detail and then a different content between the first traction control and the second traction control will be described. Referring to FIG. 6, upon the first traction control process starting, initially, the traction controller 47 commands the ignition controller 42 to cause the igniter 26 to skip ignition (IGNITION SKIP CONTROL (PATTERN 1)) (Step S11).

In the ignition skip control, ignition in at least one of the four cylinders is paused to reduce the engine driving power. In the ignition skip control, a cylinder in which ignition pauses is decided based on, for example, pattern 1 and pattern 2 which are predetermined as shown in Table 1.

TABLE 1

|  | First | Second | Third | Fourth | Fifth |
|---|---|---|---|---|---|
| Pattern 1 | X | ○ | ○ | ○ | ○ |
| Pattern 2 | X | X | ○ | ○ | ○ |

In table 1, first, second, third, fourth and fifth represent the order of ignition in the cylinders after start of the ignition skip control, ○ symbol indicates execution of ignition, and symbol × indicates that ignition pauses in the corresponding cylinder. According to the driving power to be reduced, the number of cylinders in which ignition pauses is different. In the first traction control, the ignition skip control is executed based on the pattern 1.

The ignition skip control based on the pattern 1 will be described in more detail. After start of the ignition skip control, ignition pauses in a cylinder which is scheduled to perform ignition in 1st order, but ignition occurs successively in cylinders scheduled to perform ignition in 2nd, 3rd, 4th and 5th orders. When ignition in the cylinder scheduled to perform ignition in 5th order is complete, pattern 1 is repeated, so that ignition pauses in the cylinder scheduled to perform ignition in sixth order. In summary, ignition pauses in cylinders scheduled to perform ignition in 1st, 6th, 11th, 16th, . . . (5n+1)-th orders. When the ignition skip control is executed according to the pattern 1, the cylinder in which ignition pauses is shifted one by one, and thus, ignition does not pause in the same cylinder continuously. In the pattern 2, ignition pauses in cylinders scheduled to perform ignition in 1st order and in 2nd order. In summary, ignition pauses in cylinders scheduled to perform ignition in 1st, 2nd, 6th, 7th, 11th, 12-th, . . . (5n+1)-th, (5n+2)-th orders.

During the ignition skip control, the condition determiner 46 determines whether or not the second driving power suppressing condition is met (step S12). If it is determined that the second driving power suppressing condition is met, the second traction control process is executed as described later (step S13). If it is determined that the second driving power suppressing condition is not met and the second traction control process in step S13 terminates, the condition determiner 46 determines whether or not the first driving power suppressing control is met (step S14). If it is determined that the first driving power suppressing control is met, the ignition skip control continues (step S11). If it is determined that the first driving power suppressing control is not met, the first traction control process ends and the ECU 17 returns to the normal control (step 51) (see FIG. 5).

In the first traction control, the ignition retard control may be used to reduce the driving power, instead of the ignition skip control. The ignition retard control is to retard the ignition timing by an amount corresponding to a predetermined retard angle amount, thereby reducing the driving power. Similarly to the ignition skip control, the ignition retard control is to retard the ignition timings of the cylinders according to a predetermined pattern. The ignition retard control and the ignition skip control are collectively referred to as ignition control. Instead of the ignition control, a rear wheel brake control for controlling the operation of the rear wheel brake 38 or a fuel control for reducing the amount of fuel injected from the injector 31 may be used to reduce the driving power.

In the second traction control, like the first traction control, the traction controller 47 commands the ignition controller 42 to cause the igniter 26 to skip ignition (IGNITION SKIP CONTROL PATTERN 2) (Step S21). In the second traction control according to pattern 2 (see pattern 2 in table 1), cylinders in which ignition pauses is more in number than in the first traction control according to pattern 1. By increasing the number of the cylinders in which ignition pauses in this way, a reduction amount of the driving power is increased in the second traction control to quickly reduce a spin amount of the drive wheel 3. During this ignition skip control, the condition determiner 46 determines whether or not the switch condition is met (step S22). If it is determined that the switch condition is not met, the condition determiner 46 determines whether or not the second driving power suppressing condition is met (step S23). If it is determined that the second driving power suppressing condition is met, the ignition skip control continues (step S21), while if it is determined that the second driving power suppressing condition is not met, the second traction control process ends and the process returns to step S14 (see FIG. 6).

On the other hand, if it is determined that the switch condition is met in step S22, the third traction control process is performed to execute the third traction control (step S24). In the third traction control process, the driving power is suppressed in a different method from the ignition control. To be specific, the flow rate control is performed in such a manner that the traction controller 47 commands the throttle valve controller 43 to cause the valve actuator 24 to reduce the opening degree of the sub-throttle valve 22, thereby reducing the driving power. The flow rate control reduces the engine driving power and hence the driving power applied to the drive wheel 3 to a greater degree than the ignition control. In the third traction control process, the flow rate control is continued until the condition determiner 46 determines that the switch condition is not met, and the process moves to step S23 if the condition determiner 46 determines that the switch condition is not met.

As should be appreciated from the above, in the traction control system 18, for example, the first driving power suppressing condition and the second driving power suppressing condition are variably set according to the change rate of the engine speed and the change rate of the slip ratio. If the change rate of the engine speed and the change rate of the slip ratio are higher, the gripping state of the drive wheel is more likely to get worse thereafter, whereas if these two change rates are lower, the gripping state of the drive wheel is more likely to be maintained or improved. For these reasons, the first driving power suppressing condition and the second driving power suppressing condition are flexibly set based on the change rate of the engine speed and the change rate of the slip ratio and according to a predicted gripping state. In other words, the traction control is executed according to the predicted gripping state of the drive wheel.

As described above, it is determined whether or not to execute the traction control. For example, if the above two change rates are increasing, the gripping state of the drive wheel is more likely to get worse, and therefore, the driving power suppressing condition is changed to start the traction control as promptly as possible. On the other hand, if the two change rates are decreasing, the gripping state of the drive wheel is more likely to be maintained or improved, and therefore, the driving power suppressing condition is changed to prevent the traction control from starting promptly. As a result, the traction control is allowed to start as promptly as possible when the gripping state of the drive wheel is more likely to get worse and is inhibited from being executed undesirably when the gripping state of the drive wheel is improving. Thus, the traction control is executed when necessary and is inhibited when unnecessary.

The first driving power suppressing condition and the second driving power suppressing condition can be set variably based on the change rate of the opening degree of the main throttle valve 21. By doing so, the driving power intended to be applied to the rear wheel 3 by the driver can be predicted, and thus, the driver's intention for increasing or decreasing the driving power is reflected into the first driving power suppressing condition and the second driving power suppressing condition. In this way, the first driving power suppressing condition and the second driving power suppressing condition are set in view of the driver's intention. For example, in a case where the change rate of the opening degree of the main throttle valve 21 is large, the driver may wish to apply a high driving power to the drive wheel to slip the drive wheel intentionally. In that case, the first driving power suppressing condition and the second driving power suppressing condition are changed to prevent the traction control from starting promptly (e.g., time t6 in FIG. 4). On the other hand, in a case where the change rate of the opening degree of the main throttle valve 21 is small, the drive wheel will slip undesirably if a difference in the rotation number or the change rate of the rotation of the drive system increases rapidly. In that case, it is necessary to start the traction control as promptly as possible. Therefore, the first driving power suppressing condition and the second driving power suppressing condition are changed so as to start the traction control as promptly as possible. In the manner as described above, the traction control can be executed according to the driver's intention and the undesired traction control is inhibited more effectively.

Furthermore, the first driving power suppressing condition and the second driving power suppressing condition can be set variably based on the change rate of the vehicle speed, i.e., acceleration. Based on the acceleration, the attitude of the motorcycle 1 can be predicted. For example, if the acceleration is high, the motorcycle 1 is more likely to be in a normal position, whereas if the acceleration is low, the motorcycle 1 is more likely to be banked. When the motorcycle 1 is in a normal position, the motorcycle 1 needs to be accelerated quickly, and it is undesirable to restrict the driving power applied to the drive wheel. Therefore, when the acceleration is high, the first driving power suppressing condition and the second driving power suppressing condition are set to prevent the traction control from being started promptly. In contrast, when the vehicle is banked, it is desirable to restrict the driving power to prevent a high driving power from being applied to the drive wheel. Therefore, when the acceleration is low, the first driving power suppressing condition and the second driving power suppressing condition are set to start the traction control as promptly as possible. Since the traction control is executed according to the acceleration in this way, execution/non-execution of the traction control can be switched according to the attitude of the motorcycle 1. This effectively suppresses the traction control from being executed unnecessarily.

Moreover, in the traction control system 18, since the first variable threshold $M_1$ and the variable parameters (i.e., terms) in the formulae 2-7 for setting the first variable threshold $M_1$ are weighted by the weighting coefficients $K1_{th}$, $K1_{Ne}$, $K1_{Acc}$, $K1_{sl}$, $K2_{th}$, $K2_{Ne}$, $K2_{Acc}$, and $K2_{sl}$, the condition used for executing the traction control can be adjusted depending on vehicle characteristics, etc., by varying the weighting coefficients $K1_{th}$, $K1_{Ne}$, $K1_{Acc}$, $K1_{sl}$, $K2_{th}$, $K2_{Ne}$, $K2_{Acc}$, and $K2_{sl}$. For example, in which a change rate of an engine speed is high, the weighting coefficients $K1_{Ne}$, $K2_{Ne}$, can be set smaller, whereas in the motorcycle 1 in which an allowable slip ratio is low, the weighting coefficients $K1_{sl}$, $K2_{sl}$, can be set larger. With this setting, the first driving power suppressing condition and the second driving power suppressing condition can be adjusted according to the vehicle characteristics, etc.

Since the weighting coefficients $K1_{th}$, $K1_{Ne}$, $K1_{Acc}$, $K1_{sl}$, $K2_{th}$, $K2_{Ne}$, $K1_{Acc}$, and $K2_{sl}$ are changed according to the driving state, the condition used for executing the traction control can be adjusted according to the driving state. For example, in a case where the change rate of the opening degree of the main throttle valve 21 is small but the slip ratio is high and the motorcycle 1 is more likely to be driving on a slippery road, the weighting coefficients $K1_{th}$, $K1_{Ne}$, $K1_{Acc}$, $K1_{sl}$, $K2_{th}$, $K2_{Ne}$, $K2_{Acc}$, and $K2_{sl}$ are set smaller so that the traction control is started promptly even though the monitored spin value M is small. On the other hand, in a case where the change rate of the opening degree of the main throttle valve 21 is large but the slip ratio is low and the motorcycle 1 is more likely to be driving on a road which is less slippery, the weighting coefficients $K1_{th}$, $K1_{Ne}$, $K1_{Acc}$, $K1_{sl}$, $K2_{th}$, $K2_{Ne}$, $K2_{Acc}$, and $K2_{sl}$ are set larger so that the traction control is inhibited from being started even though the monitored spin value M is large. In this way, the first driving power suppressing condition and the second driving power suppressing condition can be set according to the driving state.

In some cases, in the traction control system 18, the second variable threshold $M_2$ is smaller than the first variable threshold $M_1$ (time t4 in FIG. 4), and the condition determiner 48 is configured to determine whether or not the second driving power suppressing condition is met prior to determination as to the first driving power suppressing condition. Therefore, the traction control system 18 is configured to execute the second traction control to reduce the driving power to a greater degree without executing the first traction control. For example, in a case where the spin amount of the drive wheel increases rapidly, it becomes necessary to reduce the driving power quickly and to a greater degree. The traction control system 18 is configured to predict such a rapid increase in the wheel spin amount. In that case, the traction control system 18 is configured to execute the second traction control to reduce the driving power to a greater degree without executing the first traction control. In this way, the traction control system 18 is configured to predict a wheel spin amount and properly determine the driving power to be reduced based on the prediction.

The traction control system 18 is configured to switch between the igniter 26 and the throttle device 16 which is operative to reduce the driving power, based on whether or not the switch condition is met, thereby varying reduction of the driving power. The ignition retard control or the ignition skip control using the igniter 26 can reduce the driving power quickly. The flow rate traction control using the throttle device 16 can increase a reducing magnitude of the driving power. By switching between the ignition control using the igniter 26 and the flow rate control using the throttle device 16, the driving power can be reduced according to situations.

In the traction control system 18, in the formulae of the first driving power suppressing condition and the second driving power suppressing condition, the weighting coefficients (variable values) $K1_{th}$, $K1_{Ne}$, $K1_{Acc}$, $K1_{sl}$, $K2_{th}$, $K2_{Ne}$, $K2_{Acc}$, and $K2_{sl}$ are added without setting them larger or smaller. The weighting coefficients $K1_{th}$, $K1_{Ne}$, $K1_{Acc}$, $K1_{sl}$, $K2_{th}$, $K2_{Ne}$, $K2_{Acc}$, and $K2_{sl}$ are set larger in a case where the vehicle is in a predetermined driving state, for example, during high-speed driving when the change rates are small. This makes it possible to avoid a situation in which the first variable threshold $M_1$ and the second variable threshold $M_2$ become extremely small and the traction control is executed undesirably. For example, in a case where the driver may wish to apply a high driving power to the rear wheel 3 to slip the rear wheel 3 intentionally, the weighting coefficients (variable values) $K1_{th}$, $K1_{Ne}$, $K1_{Acc}$, $K1_{sl}$, $K2_{th}$, $K2_{Ne}$, $K2_{Acc}$, and $K2_{sl}$ are set larger, thereby making it possible to avoid a situation in which the first variable threshold $M_1$ and the second variable threshold $M_2$ become extremely small and the traction control is executed undesirably. Instead of the weighting coefficients (variable values) $K1_{th}$, $K1_{Ne}$, $K1_{Acc}$, $K1_{sl}$, $K2_{th}$, $K2_{Ne}$, $K2_{Acc}$, and $K2_{sl}$, predetermined values α, β may be varied according to a predetermined driving state of the vehicle. In this case, the same advantages are achieved.

(Embodiment 2)

A traction control system 18A according to Embodiment 2 is similar in configuration to the traction control system 18 according to Embodiment 1. Hereinafter, a different content between the traction control system 18A and the traction control system 18 will be described and the same content will not be described repetitively. The same applies to traction control systems 18B-18E according to Embodiments 3-6.

The condition determiner 46 (determiner) determines whether or not a spin condition is met. If it is determined that the spin condition is met, the condition determiner 46 determines that the rear wheel 3 is spinning undesirably with respect to the road surface R, and the driving power applied to the rear wheel 3 should be suppressed. In this embodiment, the spin condition is such that the monitored spin value M is not less than a control start determination value α which is a predetermined constant. The condition determiner 46 determines whether or not the monitored spin value M is not less than the control start determination value α. The control start determination value α is variable stepwisely according to the transmission gear position detected by the gear position sensor 29. The control start determination value α is set to increase as the transmission gear position is upshifted one by one. The control start determination value a is set larger for a 6th gear than for a 1st gear. The control start determination value α in the spin condition is not necessarily a constant, but may be a variable varying depending on the driving state and the engine running state such as the engine speed, the opening degree of the throttle valve, or their change rates. Alternatively, the control start determination value α is set to decrease as the transmission gear position is upshifted one by one.

In addition, the condition determiner 46 determines whether or not the switch condition is met. If it is determined that the switch condition is met, the condition determiner 46 determines that the rear wheel 3 is more likely to spin to a greater degree with respect to the road surface R, and the driving power should be reduced to a greater degree. The switch condition is such that the monitored spin value M exceeds a control switch value β larger than the control start determination value α. In this embodiment, the control switch value β is a constant, but may be a variable and vary according to the change rate, like the control start determination value α.

The traction controller 47 (controller) is configured to execute the traction control for reducing the driving power of the rear wheel 3 based on a result of the determination made by the condition determiner 46. In the traction control, the driving power to be reduced is varied based on a result of the determination made by the condition determiner 46. According to the driving power to be reduced, the ignition control or the flow rate control is executed as the traction control. The ignition control is to control an ignition state (at least one of ignition skip and ignition timing retard) to reduce the driving power, and is executed when the spin condition is met. The flow rate control is to control the opening degree of the sub-throttle valve 22 and is executed when the switch condition is met.

The traction controller 47 decides values of a retard amount of the ignition timing, a fuel injection amount, and an opening degree of the sub-throttle valve 22 based on a result of the determination made by the condition determiner 46, and outputs these values as commands to the ignition controller 42, the fuel controller 48, and the throttle valve controller 43, respectively. In accordance with the commands from the traction controller 47, the ignition controller 42 controls the igniter 26, the fuel controller 48 controls the injector 31, and the throttle value controller 43 controls the valve actuator 24. Hereinafter, a main control process or the like executed by the traction control system 18 will be described with reference to the flowchart of FIG. 8.

[Operation of Traction Control System]

Figure 8:
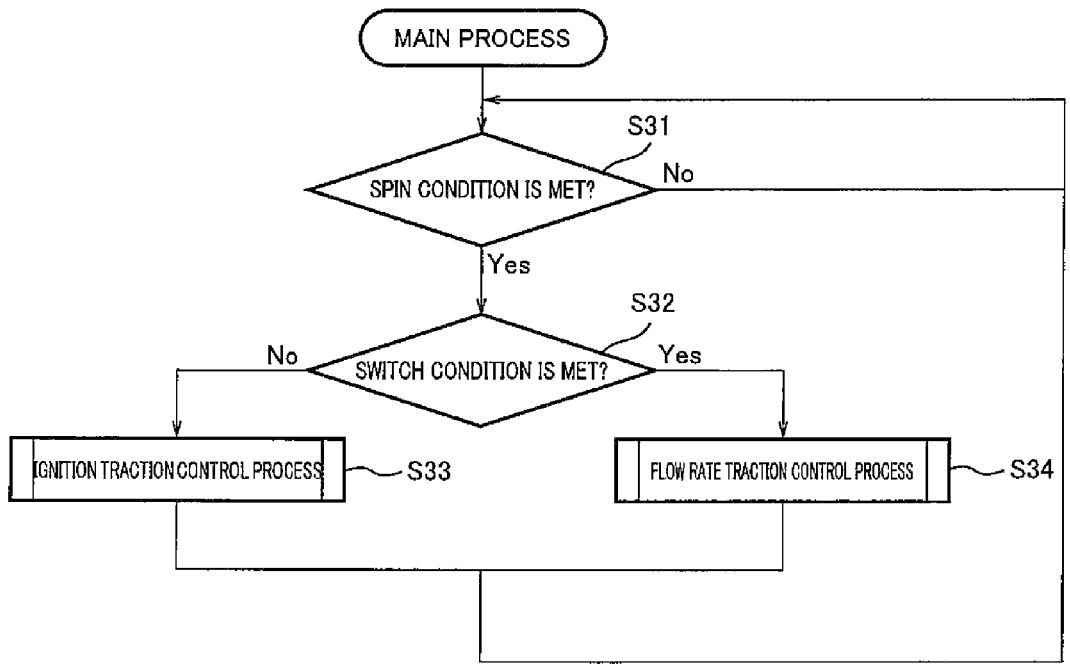
FIG. 8 is a flowchart showing a main process executed by a traction control system of Embodiment 2.

Referring to FIG. 8, upon a main power supply (not shown) of the motorcycle 1 being turned ON, the condition determiner 46 determines whether or not the spin condition is met (step S31). If it is determined that the monitored spin value M is smaller than the control start determination value α, the condition determiner 46 determines that the spin condition is not met and it is not necessary to execute the traction control. Then, the condition determiner 46 continues to determine whether or not the spin condition is met until the monitored spin value M becomes larger than the control start determination value α.

If it is determined that the monitored spin value M is larger than the control start determination value α, the condition determiner 46 then determines whether or not the switch condition is met (step S32). If it is determined that the monitored spin value M is smaller than the control switch value β, and therefore the switch condition is not met, the traction controller 47 performs the ignition traction control process to execute the ignition traction control (step S33). After that, the process returns to step S31. On the other hand, if it is determined that the monitored spin value M is larger than the control switch value β, and therefore the switch condition is met, the traction controller 47 performs the flow rate traction control process to execute the flow rate traction control (step S34). After that, the process returns to step S31. Hereinafter, the ignition traction control process and the flow rate traction control process will be hereinafter described in detail.

Figure 9:
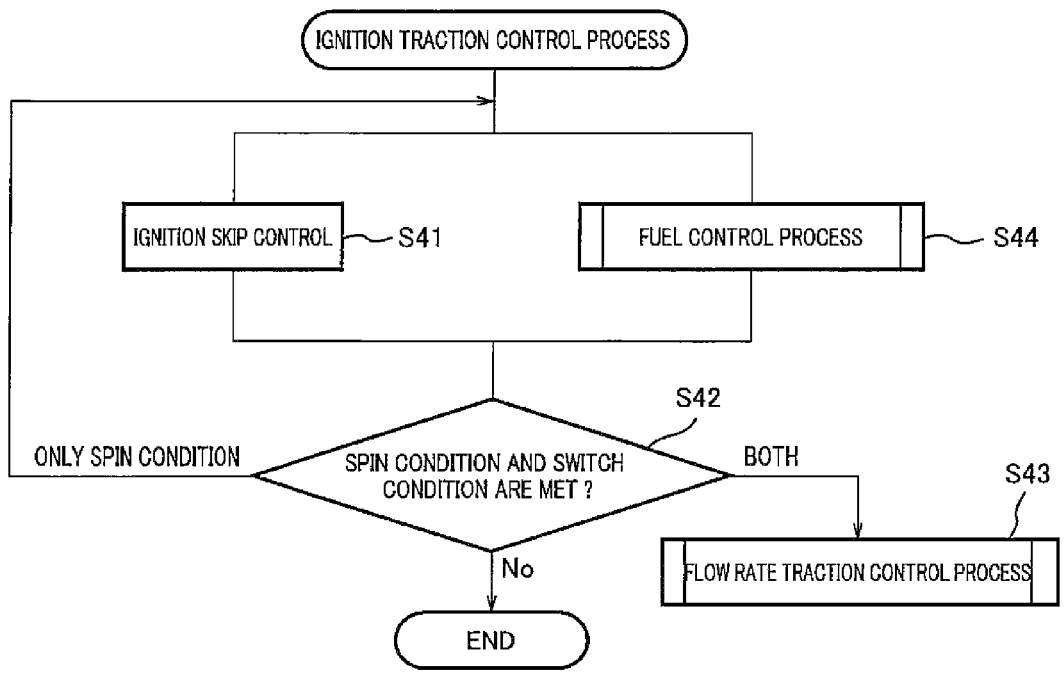
FIG. 9 is a flowchart showing an ignition traction control process executed by the traction control system.

Firstly, the ignition traction control process will be described with reference to FIG. 9. Upon the ignition traction control process starting, the traction controller 47 commands the ignition controller 42 to cause the igniter 26 to skip the ignition (IGNITION SKIP CONTROL) (step S41). In the ignition skip control, execution or non-execution (pause) of ignition in the four cylinders is caused to occur according to a predetermined control rule, to reduce the engine driving power, thereby reducing the driving power applied to the rear wheel 3. The control rule is set to repeat the ignition skip pattern as illustrated in table 2. In the ignition skip pattern in table 2, ○ symbol indicates execution of ignition and × symbol indicates pause (non-execution) of ignition.

TABLE 2

|  | First | Second | Third | Fourth | Fifth |
|---|---|---|---|---|---|
| Ignition Skip Pattern | X | ○ | ○ | ○ | ○ |

The ignition skip pattern illustrated in table 2 illustrates that execution or non-execution (pause) of ignition occurs in expansion strokes which are continuous in time series and are more than the number of the cylinders in the engine E by one. To be more specific, the ignition skip pattern is set in such a manner that ignition pauses in a cylinder scheduled to perform ignition in 1st order just after start of step S41, and thereafter ignition occurs in cylinders scheduled to perform ignition in 2nd order to 5th order four times in succession. By causing ignition to pause in the cylinder scheduled to perform ignition in 1st order just after the spin condition is met, the driving power is reduced with a higher responsiveness and the drive wheel spin is suppressed more promptly as compared to a case where ignition pauses in a predetermined cylinder. After execution or non-execution of the ignition occurs according to the ignition skip pattern, the condition determiner 46 determines again whether or not the spin condition and the switch condition are met (step S42).

If it is determined that the spin condition is met but the switch condition is not met, the process returns to step S41, and the traction controller 47 repeats the execution or non-execution of the ignition according to the ignition skip pattern shown in table 2. In other words, the traction controller 47 causes execution or non-execution of ignition to occur in the four cylinders according to the ignition skip pattern in repetition according to the ignition skip pattern shown in table 2 as long as the spin condition and the switch condition are met. To be more specific, when ignition in the cylinder scheduled to perform ignition in 5th order is complete, the ignition skip pattern is repeated and ignition pauses in the cylinder scheduled to perform ignition in 6th order after start of the ignition skip control. The traction controller 47 causes the cylinders scheduled to perform ignition in 11-th order, 16-th order, 21-th order, etc., to perform the same operation. As a result, ignition pauses in the cylinders scheduled to perform ignition in (5n+1)-th (n=0, 1, 2, 3, etc.) order after start of the ignition skip control.

When the ignition skip control is executed according to the above ignition skip pattern, the cylinder in which ignition pauses is shifted one by one in every cycle, and thus, ignition does not pause in the same cylinder continuously. This makes it possible to avoid the fuel gas remaining in the cylinder because of the pause of ignition from being exhausted from the same cylinder continuously to the muffler 52. The fuel gas does not concentrate in a localized region of the catalyst inside the muffler 52. Since unevenness of the fuel gas concentration is lessened, the localized region of the catalyst inside the muffler 52 is prevented from being heated excessively. In this way, damage to the catalyst is avoided. The ignition skip pattern is not limited to that shown in table 2 in order and number, but may be ignition skip pattern 1 or ignition skip pattern 2 as described later.

If it is determined that both of the spin condition and the switch condition are met in step S42, the traction controller 47 executes the flow rate traction control process as described later (step S43). On the other hand, if it is determined that the spin condition and the switch condition are not met in step S42, the traction controller 47 terminates the ignition skip control, and the ignition traction control process terminates. When the ignition traction control terminates, the process returns to step S4 in the main process.

Figure 10:
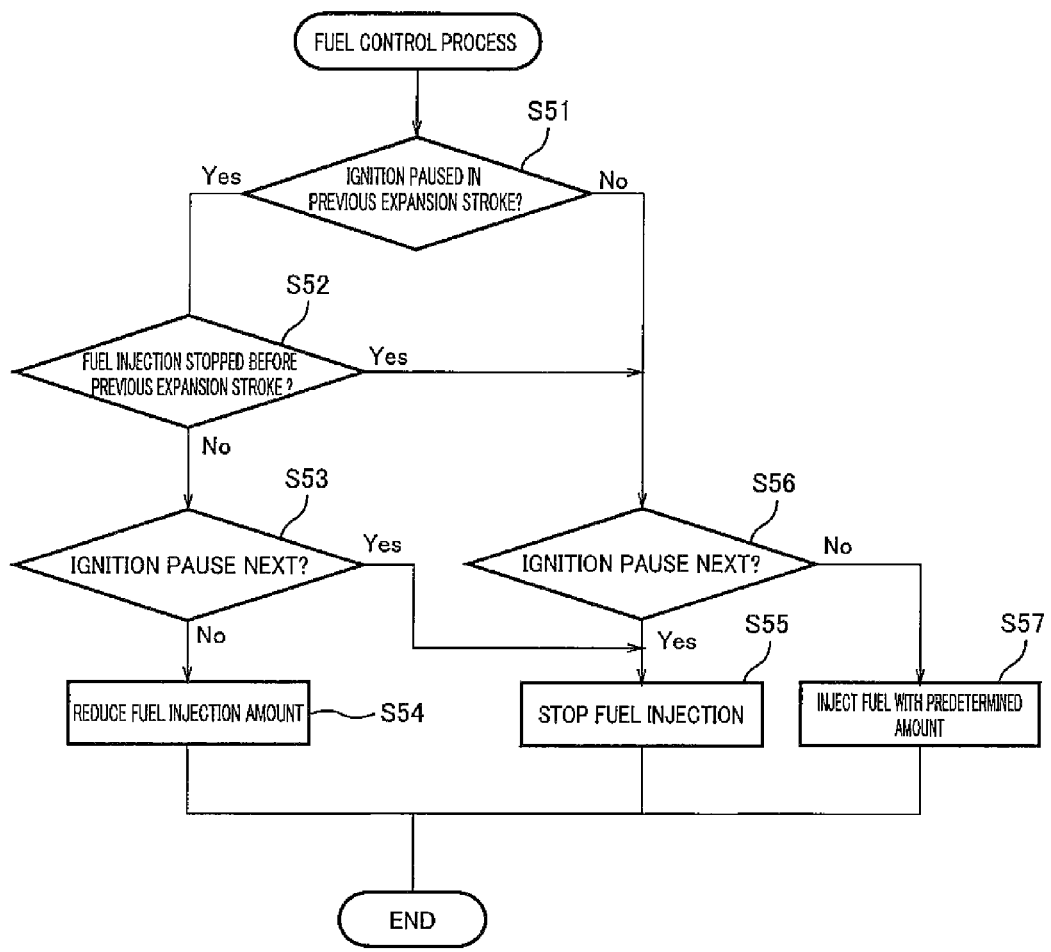
FIG. 10 is a flowchart showing a fuel control process executed by the traction control system.

Concurrently with the ignition skip control (step S31) in the ignition traction control process, the traction controller 47 executes the fuel control process (step S44). The fuel control process reduces the fuel injected next to the cylinder in which ignition paused in the ignition skip control, with respect to a predetermined amount. The predetermined amount refers to an amount set based on information detected by the throttle valve position sensor 25, the engine speed sensor 30, etc., in a state where the traction control is not being executed. Hereinafter, the fuel control process will be described with reference to FIG. 10.

The fuel control process is performed for each cylinder. The cylinder for which the fuel control process is performed is also hereinafter referred to as a target cylinder. Upon the fuel control process starting, the traction controller 47 determines whether or not ignition paused in the target cylinder in a previous expansion stroke, based on the control rule (step S51). If it is determined that ignition paused in the target cylinder in the previous expansion stroke, the traction controller 47 determines whether or not fuel injection stopped before the previous expansion stroke (step S52). If it is determined that the fuel injection did not stop, the traction controller 47 determines whether or not ignition will pause in the target cylinder in a next expansion stroke according to the control rule (step S53). Since ignition does not pause in the same cylinder twice in succession in this embodiment, the traction controller 47 determines that ignition will not pause in the target cylinder in the next expansion stroke. Then, the traction controller 47 commands the fuel controller 48 to cause the injector 31 to reduce the amount of the fuel injected next to the target cylinder, with respect to the predetermined amount (step S54).

In this embodiment, ignition does not pause in the same cylinder twice or more in succession. But, in another embodiment, as described later, ignition pauses in the same cylinder twice or more in succession. Therefore, a case where it is determined that ignition will pause in the target cylinder in the next expansion stroke in step S53 will now be described. If it is determined that ignition will pause in the target cylinder in the next expansion stroke in step S53, the traction controller 47 commands the fuel controller 48 to cause the injector 31 to stop fuel injection to the target cylinder (step S55). When the fuel injection amount is reduced or the fuel injection is stopped, the fuel control process ends.

If it is determined that ignition did not pause in the target cylinder in the previous expansion stroke in step S51, and if it is determined that fuel injection stopped before the previous expansion stroke in step S52, the traction controller 47 determines whether or not ignition will pause in the target cylinder in a next expansion stroke according to the control rule (step S56). If it is determined that ignition will pause in the target cylinder in the next expansion stroke, the traction controller 47 commands the fuel controller 48 to cause the injector 31 to stop the fuel injection to the target cylinder (step S55). On the other hand, if it is determined that ignition will not pause in the target cylinder in the next expansion stroke, the traction controller 47 commands the fuel controller 48 to cause the injector 31 to inject the fuel to the target cylinder with the predetermined amount (step S57). When the fuel injection is stopped or the fuel is injected with the predetermined amount, the fuel control process ends. If it is determined that the spin condition is met and the switch condition is not met after the fuel control process, the process returns from step S42 to step S44. Again, the fuel control process is executed, and the traction controller 47 determines whether or not ignition paused in the target cylinder in the previous expansion stroke again.

Figure 11:
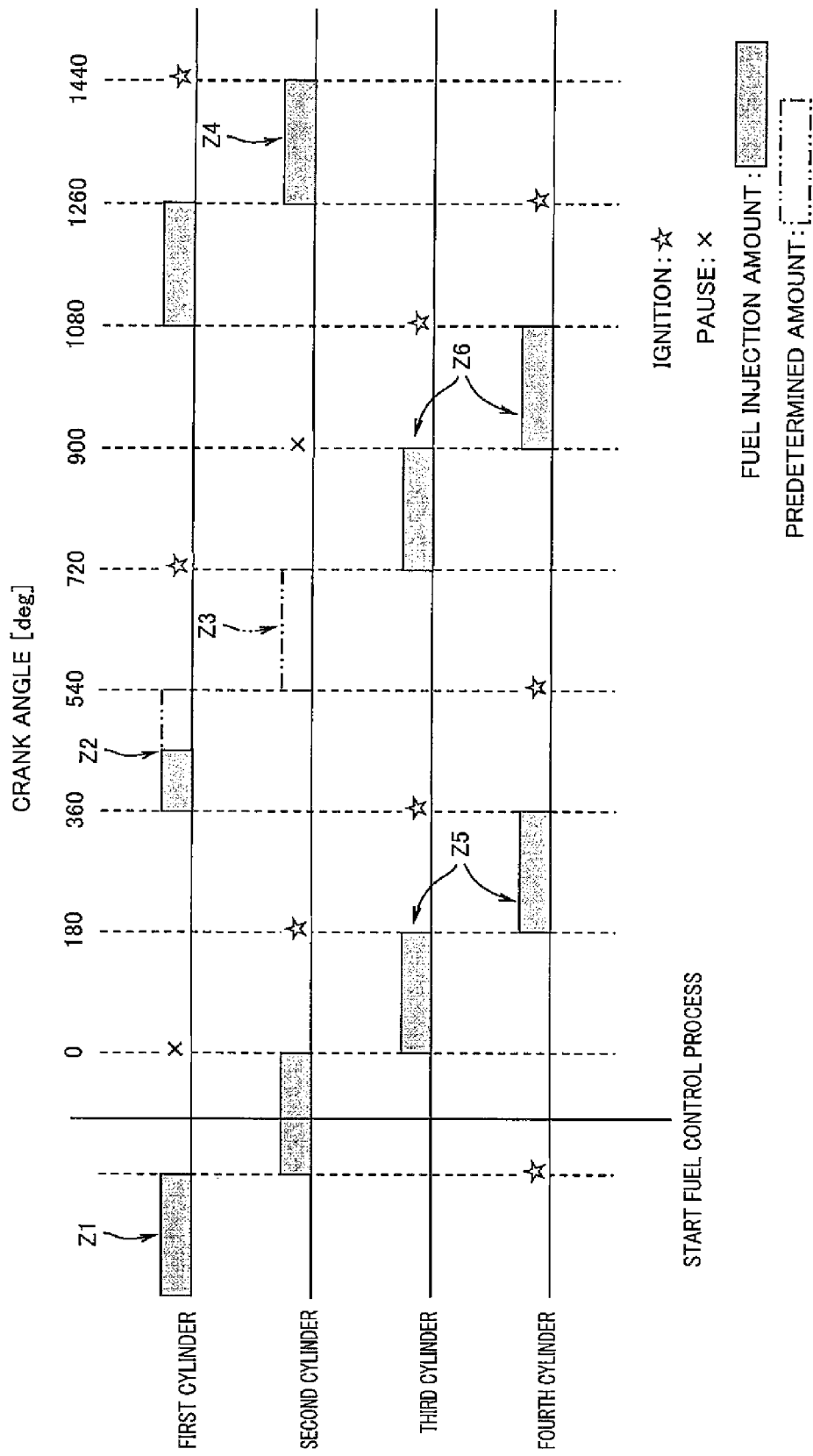
FIG. 11 is a view showing an amount of a fuel injected to each cylinder when the fuel control process is executed.

Hereinafter, the fuel control process will be described more specifically with reference to FIG. 11. In FIG. 11, white star symbol indicates that ignition occurred in the corresponding cylinder, and × symbol indicates that ignition paused in the corresponding cylinder. In this example, for the target cylinder, a fuel injection period is set before an ignition timing is reached. Hashed rectangles indicate a fuel injection amount at that point of time and two-dotted lines indicate a predetermined fuel injection amount. When the fuel is injected with the predetermined amount, only the hashed rectangular is depicted in FIG. 11. In this embodiment, the fuel control process starts upon the spin condition being met. Since the fuel has already been injected to the cylinder in which ignition pauses just after the spin condition is met, the fuel injection amount cannot be reduced (see Z1 in FIG. 11). In other words, as shown in FIG. 11, the fuel is fed with the predetermined amount to the cylinder (hereinafter also referred to as first cylinder) in which its ignition timing is reached in 1st order after start of the traction control, although ignition pauses in this cylinder. Therefore, the traction controller 47 executes the fuel control process for the first cylinder in a next expansion stroke. The traction controller 47 determines as to the first cylinder that ignition paused in a previous expansion stroke (1st order), the fuel injection did not stop, and ignition will occur in a next expansion stroke (5th order), according to the control rule (step S51, S52, S53). The traction controller 47 commands the fuel controller 48 to cause the injector 31 to reduce the amount of the fuel injected to the first cylinder with respect to the predetermined amount (see Z2 in FIG. 11).

Then, the traction controller 47 determines as to a cylinder (hereinafter also referred to as second cylinder) in which its ignition timing is reached in 2nd order from start of the traction control, that ignition occurred in a previous expansion stroke (2nd order) and ignition will pause in a next expansion stroke (6th order), according to the control rule (step S51, S56). The traction controller 47 commands the fuel controller 48 to cause the injector 31 to stop the fuel injection to the second cylinder (see FIG. Z3 in FIG. 11). Since ignition will occur in the second cylinder in a next expansion stroke (11th-order), the traction controller 47 determines, as to the second cylinder, that ignition paused in a previous expansion stroke, fuel injection stopped, and ignition will occur in a next expansion stroke after the 6th expansion stroke (step S51, step S52, step S56). The traction controller 47 commands the fuel controller 48 to cause injector 31 to inject the fuel to the second cylinder with the predetermined amount (see Z4 in FIG. 11).

The traction controller 47 commands the fuel controller 48 to cause the injector 31 to inject the fuel with the predetermined amount to the cylinder (also referred to as third cylinder) in which its ignition timing is reached in 3rd order after start of the traction control, because the ignition occurred in a previous expansion stroke (3rd order) and in a next expansion stroke (7th order) (e.g., Z5 in FIG. 11). Also, the traction controller 47 commands the fuel controller 48 to cause the injector 31 to inject the fuel with the predetermined amount to the cylinder (also referred to as 4th cylinder) in which its ignition timing is reached in 4th order after start of the traction control, because the ignition occurred in a previous expansion stroke (4th order) and in a next expansion stroke (8th order) (e.g., Z6 in FIG. 11).

Since the fuel injection amount to the cylinder in which ignition paused is reduced, it is possible to avoid a situation where the fuel gas is not combusted and exhausted but remains in the cylinder and thereby fuel gas temporarily becomes rich during non-execution of ignition. This suppresses an undesired driving power from being generated temporarily after the pause of ignition. In a case where pause of ignition is predicted, the fuel injection is stopped. Thus, the fuel gas exhausted to the muffler 52 is lessened. As a result, damage to the catalyst inside the muffler 52 is suppressed.

In the ignition control, the ignition retard control or ignition put-forward control may be executed to reduce the driving power, instead of the above mentioned ignition skip control. The ignition retard control is to retard an ignition timing with respect to an optimal timing set in non-traction control by an amount corresponding to a predetermined retard angle amount, thereby reducing the driving power. The ignition retard control or the ignition put-forward control is such that the ignition timing of any of the four cylinders is retarded or put forward, respectively, according to a predetermined control rule. The control rule for the ignition retard control is set to repeat, for example, a retard angle pattern shown in table 3. In the retard angle pattern in table 3, a numeric value indicates a retard angle amount (deg).

TABLE 3

|  | First | Second | Third | Fourth | Fifth |
|---|---|---|---|---|---|
| Retard angle pattern | 30 | 0 | 0 | 0 | 0 |

The retard angle pattern in table 3 is such that a retard angle amount is defined for expansion strokes which are continuous in time series and more than the number of cylinders in the engine E by one.

The retard angle pattern is not limited to the order and number in the pattern shown in table 3. For example, retard angle pattern 1 or retard angle pattern 2 may be used as described later. Like the ignition skip control, the fuel injection amount may be reduced according to the retard angle pattern. For example, the retard angle amounts in 2nd to 5th expansion strokes need not be set to zero degrees, but may be smaller than that in the 1st expansion stroke. By retarding the ignition timings in the 2nd to 5th expansion strokes, the reduction amount of driving power can be further increased. In addition, deterioration of the catalyst can be suppressed, although it is not suppressed so effectively as a case where the retard angle is set to 0 degrees. In a case where the ignition timings of all the expansion strokes are retarded, the driving power is controlled to be substantially maintained in an expansion stroke with a smallest retard angle amount as compared to expansion strokes with other retard angle amounts, and advantages similar to those of the above embodiments are achieved. The ignition put-forward control is substantially identical to the ignition retard control except that a put-forward angle amount replaces the retard angle amount in the ignition put-forward control, and will not be described specifically.

Upon the ignition retard control based on the retard angle pattern starting, the traction controller 47 commands the igniter 26 to retard the ignition timing of the cylinder in which its ignition timing is reached in 1st order from start of the traction control, by an amount corresponding to 30 degrees (driving power suppressing ignition control), and to perform ignition in the cylinders in which their ignition timings are reached in 2nd order to 5th order, in predetermined ignition timings, respectively (driving power maintaining ignition control). Thereafter, like the ignition skip control, the ignition retard control is repeated as long as the spin condition is met or the switch condition is not met. Thus, ignition timings corresponding to the cylinders in which their igniting timings are reached in (5n+1)-th order (n=0, 1, 2, 3, etc.) after start of the ignition retard control, are retarded.

By executing the ignition retard control in the above retard angle pattern, the cylinder whose ignition timing is retarded is shifted one by one, and as a result, ignition retard does not occur in the same cylinder continuously. This makes it possible to avoid the fuel from being exhausted from the same cylinder continuously to the muffler 52. Therefore, the fuel gas exhausted to the muffler 52 does not concentrate in a localized region of the catalyst inside the muffler 52. Because unevenness of the fuel gas concentration is lessened, the localized region of the catalyst inside the muffler 52 is prevented from being damaged or deteriorated by excess heat generation. The reduction amount of the driving power can be made less in the ignition retard control than in the ignition skip control.

Subsequently, the flow rate traction control will described. Upon the flow rate traction control process starting, the traction controller 47 executes the flow rate control. The flow rate control is to drive the valve actuator 24 to close the sub-throttle valve 22 to reduce the engine driving power, thereby reducing the driving power applied to the rear wheel 3.

In the flow rate control, the traction controller 47 calculates an opening degree $T_{sub}$ of the sub-throttle valve 22, based on a coefficient K variable according to the monitored spin value M and the opening degree Th of the main throttle valve 21. The traction controller 47 controls an air-intake amount in each cylinder using the calculated opening degree $T_{sub}$ of the sub-throttle valve 22. The opening degree $T_{sub}$ is calculated according to a formula (3):

$$T_{sub} = K \times Th \qquad (3)$$

Figure 12:
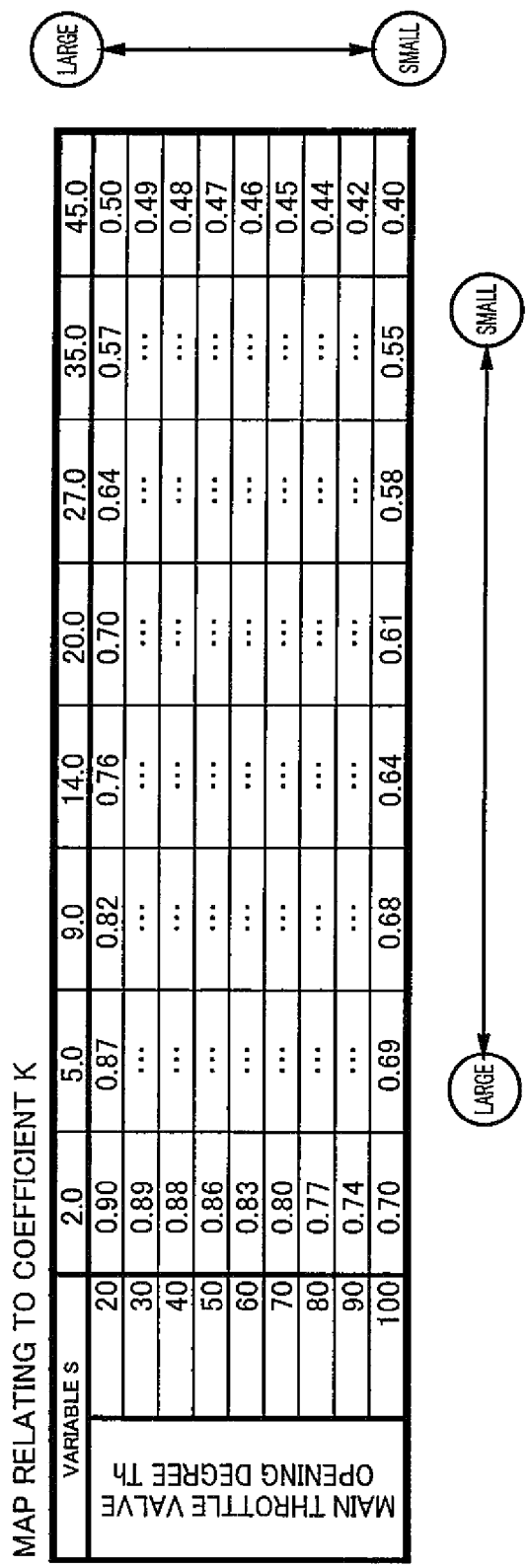
FIG. 12 is a table showing a map relating to a coefficient K in the traction control system.

The coefficient K is a value determined by a variable S obtained by subtracting an allowable slip ratio $S_t$ from the monitored spin value M which is a current slip ratio and the opening degree Th of the main throttle valve 21. The coefficient K is stored in the traction controller 47 as a map as shown in FIG. 12. The allowable slip ratio $S_t$ is a value set according to a transmission gear position set in the transmission 14 such that the slip ratio $S_t$ is larger as the transmission gear position is upshifted.

As shown in FIG. 12, the map is set such that the coefficient K is smaller as the variable S is larger and the opening degree Th is larger. The traction controller 47 calculates the variable S based on the monitored spin value M obtained from the monitored value calculator 45, and further obtains the opening degree Th of the main throttle valve 21 via the condition determiner 46. Then, the traction controller 47 decides the coefficient K based on the calculated variable S and the opening degree Th with reference to the map shown in FIG. 12.

Since the coefficient K is decided according to the opening degree Th of the main throttle valve 21, the sub-throttle valve 22 is closed to a greater degree when the opening degree Th is larger, while the sub-throttle valve 22 is closed to a smaller degree when the opening degree Th is smaller, thereby suppressing a reduction amount of the driving power from increasing or decreasing undesirably. To be specific, it is possible to avoid a situation where the driving power is not suppressed sufficiently when the opening degree Th is large but the sub-throttle valve 22 is closed to a smaller degree, or the driving power is reduced more than assumed when the opening degree Th is small but the sub-throttle valve 22 is closed to a greater degree.

The flow rate control continues as long as the switch condition is met. If it is determined that the switch condition is not met, the traction controller 47 terminates the flow rate control and the flow rate traction control process ends. When the flow rate traction control process ends, the process returns to the step S31 (see FIG. 8).

As described above, the traction control system 18 firstly executes the ignition traction control with a high responsiveness to quickly reduce the driving power applied to the rear wheel 3, thereby quickly reducing a spin amount of the rear wheel 3. If a reduction amount of the driving power is insufficient when only the ignition traction control is used, the ignition traction control switches to the flow rate traction control to reduce the driving power applied to the rear wheel 3 more. By this switching, the driving power is reduced without pausing or retarding the ignition in each cylinder. In this way, the fuel gas exhausted from the cylinder to the muffler 52 can be reduced. As a result, deterioration of the catalyst can be suppressed.

Although in this embodiment, the driving power is reduced by controlling opening degree $T_{sub}$ of the sub-throttle valve 22, in the flow rate traction control process, the main throttle valve 21 may be provided with an actuator to allow the traction control system 18 to control the opening degree Th of the main throttle valve 21. In that case, the sub-throttle valve 22 may be omitted.

(Embodiment 3)

A traction control system 18B of Embodiment 3 is different from the traction control system 18A of Embodiment 2 in a content of the main control process, but is identical in configuration to the traction control system 18 of Embodiment 1.

Hereinafter, the main process executed by the traction control system 18B of Embodiment 3 will be described. The same constituents are designated by the same reference symbols and will not be described repetitively. The same applies to traction control systems 18C-18E of Embodiment 4-Embodiment 6 described below.

Figure 13:
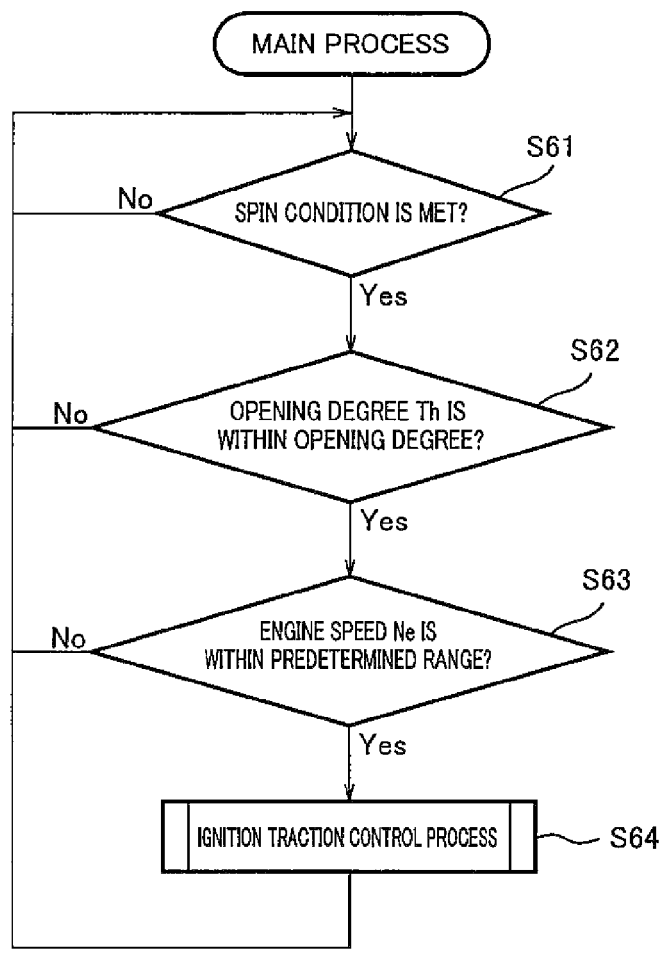
FIG. 13 is a flowchart showing a main process executed by a traction control system of Embodiment 3

Referring to FIG. 13, in the main process executed by the traction control system 18B of Embodiment 3, upon the main power supply (not shown) of the motorcycle 1 being turned ON, the condition determiner 46 determines whether or not the spin condition is met (step S61). If it is determined that the monitored spin value M is smaller than the control start determination value α, the condition determiner 46 determines that the spin condition is not met and it is not necessary to execute the traction control. Then, the condition determiner 46 continues to determine whether or not the spin condition is met until the monitored spin value M becomes larger than the control start determination value α.

If it is determined that the monitored spin value M is larger than the control start determination value α, the condition determiner 46 obtains the opening degree of the main throttle valve 21 from the throttle valve position sensor 25 and determines whether or not the opening degree Th falls within a predetermined opening degree range (Th1≤Th≤Th2, Th1, Th2: predetermined constants) (step S62). If it is determined that the opening degree Th falls within the predetermined opening degree range, the condition determiner 46 determines that it is not necessary to execute the traction control, and the process returns to step S61.

If it is determined that the opening degree Th is outside the predetermined opening degree, the condition determiner 46 obtains an engine speed Ne detected by the engine speed sensor 30, and determines whether or not the engine speed Ne falls within a predetermined engine speed range (Ne1≤Ne≤Ne2, Ne1, Ne2: predetermined constants) (step S63). If it is determined that the engine speed Ne falls within the predetermined engine speed range, the condition determiner 46 determines that it is not necessary to execute the traction control, and the process returns to step S61. If it is determined that the engine speed Ne is outside the predetermined engine speed range, the traction controller 47 executes the ignition traction control process (step S64), and thereafter, the process returns to step S61.

In the traction control system 18B configured to execute the traction control as described above, for example, Th1 and Th2 are set to larger values and Ne1 and Ne2 are set to larger values. With this configuration, it is possible to avoid the traction control from being executed when a wheel spin amount is increasing but the motorcycle 1 is driving with a relatively stable attitude, for example, in a case where the motorcycle 1 is accelerated and Th and Ne are larger. This can prevent the driving power applied to the rear wheel 3 from being suppressed undesirably. Alternatively, the opening degree range and the engine speed range may be such that Th1≤Th and Ne1≤Ne.

(Embodiment 4)

Figure 14:
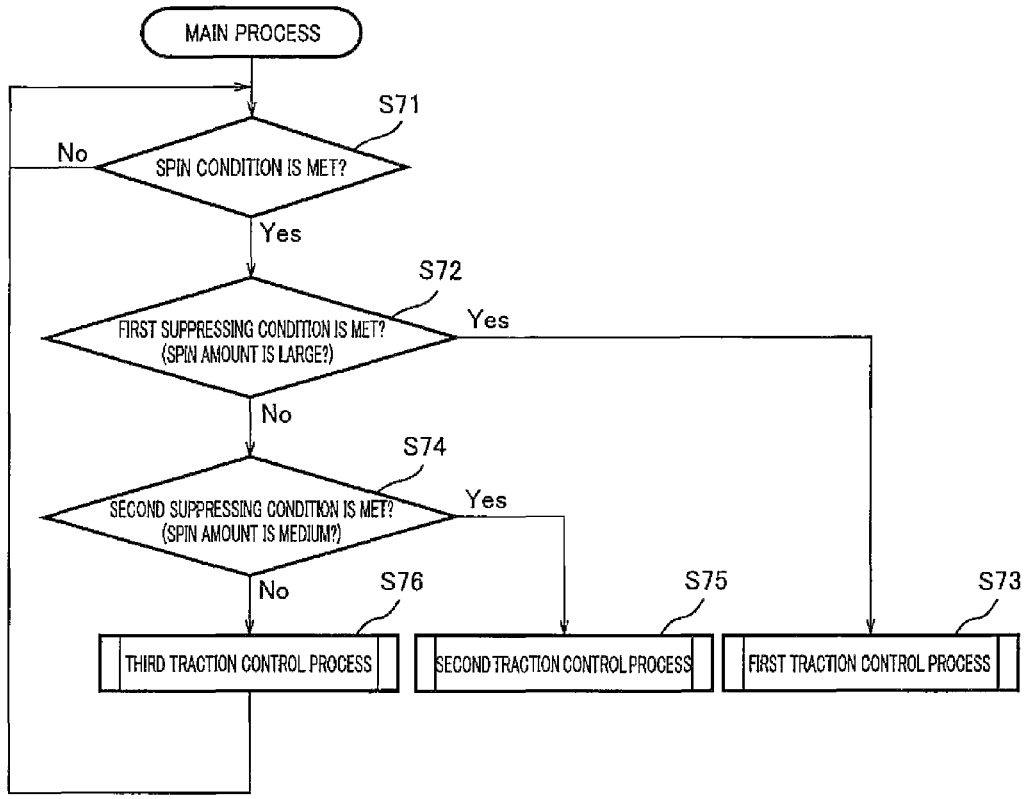
FIG. 14 is a flowchart showing a main process executed by traction control systems of Embodiment 4 and Embodiment 5.

Referring to FIG. 14, in the main process executed by the traction control system 18C of Embodiment 4, upon the main power supply (not shown) of the motorcycle 1 being turned ON, the condition determiner 46 determines whether or not the spin condition is met (step S71). If it is determined that the monitored spin value M is smaller than the control start determination value α, the condition determiner 46 determines that the spin condition is not met and it is not necessary to execute the traction control. Then, the condition determiner 46 continues to determine whether or not the spin condition is met until the monitored spin value M becomes larger than the control start determination value α.

If it is determined that the monitored spin value M is larger than the control start determination value α, then the condition determiner 46 determines whether or not the monitored spin value M meets the first driving power suppressing condition to decide a reduction amount of the driving power (step S72). The first driving power suppressing condition is, for example, such that the monitored spin value M is not less than a first spin amount determination value γ which is a predetermined constant. The first spin amount determination value γ is set larger than the control start determination value α and a second spin amount determination value δ as described later. The first spin amount determination value γ is variable stepwisely according to the transmission gear position detected by the gear position sensor 29, like the control start determination value α. If the above first driving power suppressing condition is met, the traction controller 47 executes the first traction control process as described later (step S73).

If it is determined that the first driving power suppressing condition is not met, the condition determiner 46 determines whether or not the second driving power suppressing condition is met (step S74). The second driving power suppressing condition is, for example, such that the monitored spin value M is not less than a second spin amount determination value δ which is a predetermined constant. The second spin amount determination value δ is set larger than the control start determination value α and larger than the first spin amount determination value γ (α<δ<γ). The second spin amount determination value δ is variable stepwisely according to the transmission gear position detected by the gear position sensor 29, like the control start determination value α. If the above described second driving power suppressing condition is met, the traction controller 47 executes the second traction control process (step S75). On the other hand, if the second driving power suppressing condition is not met, the traction controller 47 executes the third traction control process (step S76).

Hereinafter, the first traction control process, the second traction control process, and the third traction control process will be described. The first traction control process, the second traction control process, and the third traction control process are processes executed in the ignition traction control. The flowcharts of these control processes are identical to the flowcharts of the ignition traction control process of Embodiment 1 except for a control rule used for controlling execution and non-execution (pause) of ignition in the cylinders. Hereinafter, the control rules corresponding to the first to third traction control processes will be described and the flowcharts of them will not be described repetitively.

In the first traction control process, the traction controller 47 carries out execution or non-execution of ignition in each cylinder according to the first control rule to reduce the engine driving power. In the second traction control process, the traction controller 47 carries out execution or non-execution of ignition in each cylinder according to the second control rule to reduce the engine driving power. In the third traction control process, the traction controller 47 carries out execution or non-execution of ignition in each cylinder according to the third control rule to reduce the engine driving power. The first control rule is set to repeat ignition skip pattern 1 in table 4, the second control rule is set to repeat ignition skip pattern 2 in table 4, and the third control rule is set to repeat ignition skip pattern 3 in table 4. In table 4, ○ symbol indicates execution of ignition in the corresponding cylinder and × symbol indicates pause (non-execution) of ignition in the corresponding cylinder.

TABLE 4

|  | First | Second | Third | Fourth | Fifth |
|---|---|---|---|---|---|
| ignition skip pattern 1 | X | X | ○ | X | ○ |
| ignition skip pattern 2 | X | X | ○ | ○ | ○ |
| ignition skip pattern 3 | X | ○ | ○ | ○ | ○ |

The ignition skip patterns 1-3 illustrated in table 4 show that execution or non-execution of ignition occurs in expansion strokes which are continuous in time series and are more than the number of the cylinders in the engine E by one, like that shown in table 2. The ignition skip pattern 3 is identical to the ignition skip pattern shown in table 2.

For example, in the first traction control process, according to the ignition skip pattern 1, the traction controller 47 causes ignition to pause successively in a cylinder in which its ignition timing is reached in 1st order just after start of the traction control and in a cylinder in which its ignition timing is reached in 2nd order just after start of the traction control, and causes ignition to occur in a cylinder in which its ignition timing is reached in 3rd order just after start of the traction control. Thereafter, the traction controller 47 causes ignition to pause in a cylinder in which its ignition timing is reached in 4th order just after start of the traction control, and causes ignition to occur in a cylinder in which its ignition timing is reached in 5th order just after start of the traction control. Thereafter, according to the ignition skip pattern 1, ignition occurs or pauses in the respective four cylinders. As a result, ignition to pauses in cylinders scheduled to perform ignition in (5n+1)-th order, (5n+2)-th order, and (5n+4)-th order (n=0, 1, 2, 3, etc.), and not to pause in the same cylinder three times or more in succession.

For example, in the second traction control process, according to the ignition skip pattern 2, the traction controller 47 causes ignition to pause successively in a cylinder in which its ignition timing is reached in 1st order just after start of the traction control and in a cylinder in which its ignition timing is reached in 2nd order just after start of the traction control, and causes ignition to occur in cylinders in which their ignition timings are reached in 3rd order to 5th order just after start of the traction control. Thereafter, according to the ignition skip pattern 2, ignition occurs or pauses in the respective four cylinders. As a result, ignition is pauses in cylinders scheduled to perform ignition in (5n+1)-th order and (5n+2)-th order (n=0, 1, 2, 3, etc.), and not to pause in the same cylinder three times or more in succession.

The traction control system 18C is configured to vary the number of cylinders in which ignition pauses according to the patterns of the control rules 1-3 to vary a reduction amount of the engine driving power, i.e., a reduction amount of the driving power applied to the rear wheel 3, for each of the control rules 1-3. By selecting one of the control rules 1-3 depending on the wheel slip amount, a reduction amount of the driving power according to the wheel spin amount is implemented. In this way, the traction control system 18C can prevent the driving power from being reduced undesirably and promptly stop the spin of the rear wheel 3 regardless of the wheel spin amount. According to the control rules 1-3, since ignition does not pause in the same cylinder three times or more in succession, it is possible to avoid the fuel gas exhausted to the muffler 52 from having an uneven concentration within the muffler 52. Because unevenness of the fuel gas concentration is lessened, it is possible to prevent a localized region of the catalyst inside the muffler 52 from being heated excessively. Thus, damage to the catalyst is avoided.

Like Embodiment 2, the ignition retard control may be executed to reduce the driving power, instead of the ignition skip control. In that case, the first control rule in the first traction control process is set so as to repeat retard angle pattern 1 in table 5, the second control rule in the second traction control process is set so as to repeat retard angle pattern 2 in table 5, and the third control rule in the third traction control process is set so as to repeat retard angle pattern 3 in table 5. In table 5, a numeric value indicates a retard angle amount (deg).

TABLE 5

|  | First | Second | Third | Fourth | Fifth |
|---|---|---|---|---|---|
| Retard angle pattern 1 | 30 | 30 | 0 | 30 | 0 |
| Retard angle pattern 2 | 30 | 30 | 0 | 0 | 0 |
| Retard angle Pattern 3 | 30 | 0 | 0 | 0 | 0 |

The retard angle pattern in table 5 is such that a retard angle amount is defined for expansion strokes which are continuous in time series and more than the number of cylinders in the engine E by one. The ignition retard control based on the control rules 1-3 is identical to the ignition skip control based on the control rules 1-3 except for whether ignition timing retard or ignition skip is used to reduce the engine driving power, and therefore, will not be described specifically.

The ignition retard control which selects one of the control rules 1-3 based on the wheel spin amount can achieve advantages substantially identical to those of the ignition skip control which selects one of the control rules 1-3 based on the wheel spin amount, except that the reduction amount of the driving power is less in the ignition retard control.

(Embodiment 5)

The traction control system 18D of Embodiment 5 is configured to execute the main process identical to that executed by the traction control system 18C of Embodiment 3 except for the contents in the first traction control process to the third traction control process. Therefore, the main process will not be described repetitively, but the first traction control process to the third traction control process will be described.

In the first traction control process, the traction controller 47 executes the ignition skip control and the ignition retard control at the same time according to the fourth control rule, to reduce the engine driving power. The fourth control rule is set such that the ignition skip and retard angle pattern shown in table 6 is repeated. In table 6, × symbol indicates pause of ignition and a numeric value indicates a retard angle amount (deg).

TABLE 6

|  | First | Second | Third | Fourth | Fifth |
|---|---|---|---|---|---|
| Ignition skip and retard angle pattern 1 | X | 30 | 0 | 0 | 0 |

The ignition skip and retard angle pattern shown in table 6 represents that ignition occurs or pauses in expansion strokes which are continuous in time series and are more than the number of cylinders by one and a retard angle amount of the ignition timing. To be specific, the traction controller 47 causes ignition to pause in a cylinder in which its ignition timing is reached in 1st order and causes ignition to occur four times in succession in cylinders in which their ignition timings are reached in 2nd order to 5th order. Note that the ignition timing of the cylinder in which its ignition timing is reached in 2nd order is retarded by an amount corresponding to a retard angle amount of 30 degrees. By combining the ignition skip control and the ignition retard control in this way, the traction controller 47 can finely control the reduction amount of the driving power. The number of cylinders in which ignition pauses, an interval of pause of these cylinders, and the number of cylinders in which their ignition timings are retarded may be changed according to the reduction amount of the driving power. The interval of the cylinders in which ignition pauses is changed in such a manner that the cylinder in which ignition pauses is changed from the cylinder in which its ignition timing is reached in 2nd order to the cylinder in which its ignition timing is reached in 3rd order, in the ignition skip pattern 2 in table 4 showing that ignition pauses in the cylinders in which their ignition timings are reached in 1st order and 2nd order, respectively. In this way, by changing the interval of the cylinders in which ignition pauses, the reduction amount of the driving power can be changed.

In the second traction control process, the ignition skip control is executed according to the control rule 1. In other words, the ignition skip control repeating the ignition skip pattern 1 is executed. In the third traction control process, the ignition retard control is executed according to the control rule 1. In other words, the ignition retard control repeating the retard angle pattern 1 is repeated.

By varying the control method among the first traction control process, the second traction control process and the third traction control process according to the wheel spin amount as described above, the reduction amount of the driving power applied to the rear wheel 3 can be changed according to the wheel spin amount. Since the ignition retard control and the ignition skip control are executed according to the control rules 1 and 4, damage to the catalyst can be suppressed and deterioration of the catalyst can be prevented.

Although in the traction control system 18D of Embodiment 5, the ignition retard control and the ignition skip control are executed according to one of the predetermined control rules, in each of the first traction control process to the third traction control process, the control rule may be selected according to the value of the monitored spin value M in each of the first traction control process to the third traction control process. For example, in the third traction control process, a predetermined first threshold $\delta 1$ and a predetermined second threshold $\delta 2$ ($\delta 2 \leq \delta 1$) are set. The traction controller 47 is configured such that when $\delta 1 \leq$ monitored spin value M, the ignition retard control is executed according to the control rule 1 (see retard angle pattern 1 in table 5). The traction controller 47 is configured such that when $\delta 2$ monitored spin value M$\leq \delta 1$, the ignition retard control is executed according to the control rule 2 (see retard angle pattern 2 in table 5). The traction controller 47 is configured such that when monitored spin value M$\leq \delta 2$, the ignition retard control is executed according to the control rule 3 (see retard angle pattern 3 in table 5).

In the same manner, in the first and second traction control processes, the traction controller 47 is configured to select the control rule according to the value of the monitored spin value M.

In the first traction control process, the control rule 4-6 is selected according to the value of the monitored spin value M. The control rule 4 is set so as to repeat ignition skip and retard angle pattern 1 in table 7. The control rule 5 is set so as to repeat ignition skip and retard angle pattern 2 in table 7. The control rule 6 is set so as to repeat ignition skip and retard angle pattern 3 in table 7. In table 7, × symbol indicates pause of ignition and a numeric value indicates a retard angle amount (deg).

TABLE 7

|  | First | Second | Third | Fourth | Fifth |
|---|---|---|---|---|---|
| Ignition skip and retard angle pattern 1 | X | 30 | 0 | 0 | 0 |
| Ignition skip and retard angle pattern 2 | X | X | 0 | 30 | 0 |
| Ignition skip and retard angle pattern 3 | X | X | 30 | X | 0 |

As should be appreciated from the above, in each of the traction control processes, the reduction amount of the driving power can be controlled finely by selecting the control rule according to the value of the monitored spin value M.

The plurality of control rules selected according to the value of the monitored spin value M may be such that intervals of the ignition timings to be controlled are made different from each other, instead of the above mentioned control rules in which the number of the cylinders whose ignition states are controlled. When the ignition state is an ignition retard angle amount, the ignition retard angle amount may be made different. Moreover, the number of cylinders whose ignition states are controlled, interval of these cylinders, the ignition retard angle amount, etc. may be compositely made different. Since the reduction amount of the driving power is made different, a proper reduction amount of the driving power according to the spin amount is implemented.

The traction control system 18D may be configured to select the control rule, according to the driving state, or the engine running state, such as the vehicle speed, the throttle valve opening degree, or the gear ratio, instead of the monitored spin value M.

(Embodiment 6)

Figure 15:
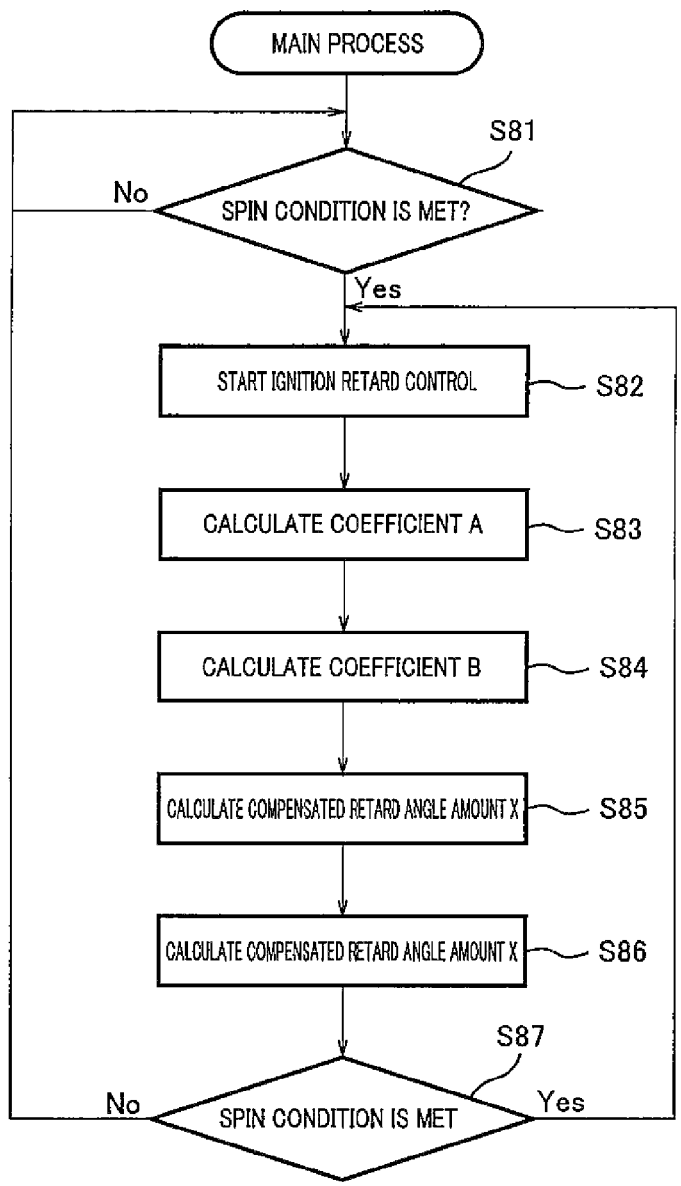
FIG. 15 is a flowchart showing a main process executed by a traction control system of Embodiment 6.

Referring to FIG. 15, in the main process executed by the traction control system 18E of Embodiment 6, upon the main power supply (not shown) of the motorcycle 1 being turned ON, the condition determiner 46 determines whether or not the spin condition is met (step S81). If it is determined that the monitored spin value M is smaller than the control start determination value α, the condition determiner 46 determines that the spin condition is not met and it is not necessary to execute the traction control. Then, the condition determiner 46 continues to determine whether or not the spin condition is met until the monitored spin value M becomes larger than the control start determination value α.

If it is determined that the monitored spin value M is larger than the control start determination value α, the traction controller 47 starts the ignition retard control according to a control rule set so as to repeat a retard angle pattern (step S82). Upon the ignition retard control starting, the traction controller 47 obtains an engine speed Ne (monitored engine value) via the condition determiner 46, and calculates a coefficient A based on the engine speed Ne (step S83). The coefficient A is variable according to the engine speed Ne as shown in FIG. 16A. This variation is shown in table 8.

TABLE 8

| Engine speed range | Coefficient A |
|---|---|
| 0 ≤ Ne ≤ Ne3 | A = 0 |
| Ne3 < Ne ≤ Ne4 | A = (Ne − Ne3)/(Ne3 − Ne4) |
| Ne4 < Ne ≤ Ne5 | A = 1 |
| Ne5 < Ne ≤ Ne6 | A = −(Ne − Ne5)/(Ne5 − Ne6) + 1 |
| Ne6 < Ne | A = 0 |

Ne3-Ne6 indicate predetermined engine speeds, and are values satisfying Ne3 < Ne4 < Ne5 < Ne6.

After calculating the coefficient A, the traction controller 47 obtains the opening degree Th (monitored engine value) of the main throttle valve 21 via the condition determiner 46 and calculates a coefficient B based on the obtained opening degree Th (step S84). The coefficient B is variable according to the opening degree Th as shown in FIG. 16B and is shown in table 9.

TABLE 9

| Opening degree range | Coefficient B |
|---|---|
| 0 < Th ≤ Th3 | B = 0 |
| Th3 < Th ≤ Th4 | B = (Th − Th3)/(Th3 − Th4) |
| Th4 < Th ≤ Th5 | B = 1 |
| Th5 < Th ≤ Th6 | B = −(Th − Th5)/(Th5 − Th6) + 1 |
| Th6 < Th | B = 0 |

Th3-Th6 indicate predetermined throttle valve opening degrees and are values satisfying Th3 < Th4 < Th5 < Th6.

After calculating the coefficient B, the traction controller 47 calculates a compensated retard angle amount Xdeg according to a formula (3) (step S85):

$$X\text{deg} = A \times B \times \theta \qquad (3)$$

where θ is a retard angle amount defined in the retard angle pattern of the control rule, and is 30 deg as shown in table 3. For example, when the coefficient A and the coefficient B are calculated as 0.5 according to the engine speed Ne and the opening degree Th, the compensated retard angle amount Xdeg is 0.5×0.5×30=7.5 deg. When one of the coefficient A and the coefficient B is 0, the compensated retard angle amount Xdeg is 0 deg, while when the coefficient A and the coefficient B are 1, the compensated retard angle amount Xdeg is 30 deg. By calculating the compensated retard angle amount Xdeg in this way, a memory capacity can be made less than in a case where the values are stored in a memory (not shown) in the form of a map. As a result, a burden on the memory built into the ECU 17 can be reduced. After calculating the compensated retard angle amount Xdeg, the traction controller 47 changes the retard angle amount of the retard angle pattern in the control rule into the compensated retard angle amount Xdeg and executes the ignition retard control (step S86).

During the ignition retard control, the condition determiner 46 determines whether or not the spin condition is met again (step 87). If it is determined that the spin condition is met, the process returns to step S82 and the ignition retard control is repeated as long as the spin condition is met. If it is determined that the spin condition is not met, the process returns to step S81, and the condition determiner 46 continues to determine whether on not the spin condition is met until the monitored spin value M becomes larger than the control start determination value α.

By executing the ignition retard control as described above, it is possible to suppress a sudden fluctuation in the driving power at the start of or at the end of the traction control. This makes it possible to accelerate or decelerate the motorcycle 1 smoothly during the traction control. Since the retard angle amount is gradually increased or decreased when the engine speed Ne is low, the opening degree Th is small and influence by the ignition retard control is great, it is possible to suppress a fluctuation in the driving power to mitigate an impact provided to the driver.

Although in this embodiment, the compensated retard angle amount Xdeg is calculated by (coefficient value A×coefficient B×retard angle amount θ), it may be calculated by (coefficient value A or the coefficient B×retard angle amount θ). The coefficient A and the coefficient B are not necessarily values decided according to the engine speed Ne and the opening degree Th. For example, the coefficient A may be set to vary with time after start of the traction control and the coefficient B may be set to vary with time after it is determined that the spin condition is not met. In this case, the coefficient A is set so as to increase in proportion to a time until a certain time lapses after start of the traction control, and is set to 1 after lapse of the certain time. The coefficient B is set to 1 to decrease in proportion to time, from when a predetermined condition is met until the spin condition is met, and set to 0 after it is determined that the spin condition is not met. By setting the coefficients A and B as described above, it is possible to suppress a sudden fluctuation in the driving power at the start or at the end of the traction control. This makes it possible to accelerate or decelerate the motorcycle 1 smoothly during the traction control.

Although in this embodiment, the engine speed Ne4 and the opening degree Th4 are used as the thresholds to gradually reduce the coefficient A and the coefficient B from 1, the coefficient A and the coefficient B may be gradually decreased, in response to an operation performed before accelerating the motorcycle 1, as a trigger, for example, in a case where a brake operation terminates or a bank angle of the motorcycle 1 is decreasing, for example. By doing so, the traction control is terminated by the time the driver starts accelerating the motorcycle 1. This makes it possible to prevent the traction control for reducing the driving power from being executed undesirably, during acceleration.

The condition determiner 46 determines whether or not the brake operation terminates, based on information from the brake switch 53. The condition determiner 46 determines the bank angle of the motorcycle 1 based on information from the bank angle sensor 32.

(Other Embodiment)

Although in Embodiment 1 the present invention is applied to the motorcycle 1 including the engine E, it may be applied to a motorcycle configured to drive a drive wheel using a motor. In this case, as the first driving power suppressing condition and the second driving power suppressing condition, a motor rotation number is used instead of the engine speed Ne. In the first traction control to the third traction control, the driving power is reduced by brake control, instead of the ignition skip control, the ignition retard control, and the flow rate control.

Although in Embodiment 1 the engine speed Ne is used as a rotation number of a drive system to set the first variable threshold $M_1$ and the second variable threshold $M_2$, a rotation number of the drive system such as a drive sprocket or a driven sprocket which is coupled to the engine E, instead of the engine speed Ne. A drive shaft may be used instead of the chain 15 connecting the transmission 14 to the rear wheel 3 and the rotation number of the drive shaft may be used instead of the engine speed Ne. These rotation numbers change rapidly upon the rear wheel 3 starting spinning. In other words, the rotation numbers are values varied according to the spin amount of the drive wheel 3.

Although in Embodiment 1, the opening degree of the sub-throttle valve 22 is controlled in the flow rate control, the main throttle valve 21 is provided with the valve actuator 24 so that its opening degree is variable to control the flow rate of the air. In this case, the sub-throttle valve 22 may be omitted.

A stroke sensor may be attached on a rear damper (not shown) in the motorcycle 1 to detect a stroke amount (state-relating value) and the first variable threshold $M_1$ and the second variable threshold $M_2$ may be set according to the stroke amount. For example, if the stroke amount is large, a load applied to the rear wheel 3 is large and the rear wheel 3 is less likely to spin, and therefore the first variable threshold $M_1$ and the second variable threshold $M_2$ are set smaller. On the other hand, if the stroke amount is small, a load applied to the rear wheel 3 is small and the rear wheel 3 is more likely to spin, and therefore the first variable threshold $M_1$ and the second variable threshold $M_2$ are set larger. In this way, the first variable threshold $M_1$ and the second variable threshold $M_2$ are set according to a change in a load distribution (vehicle state) of the motorcycle 1 so that the traction control is prevented from being executed undesirably.

Although in Embodiment 1, two driving power suppressing conditions are set, only one driving suppressing condition may be set or three or more driving power suppressing conditions may be set.

In Embodiment 1, the first and second driving power suppressing conditions are set based on a variable parameter and vary according to a change rate per unit time of at least one of state-relating values such as Th, Ne, slip, acceleration, acceleration request value (accelerator grip displacement amount), etc. A restricting condition may be variable based on a change rate of the state-relating value, and the above illustrated formulae are merely exemplary and may be suitably set. For example, the restricting condition may be set based on only the change rate of the opening degree of the throttle valve 21 or only the change rate of the vehicle speed.

In embodiment 2-Embodiment 6, the rotation number of the drive system such as the drive sprocket or the driven sprocket which is coupled to the engine E may be used to, for example, calculate the monitored spin value M, instead of using the engine speed Ne. The drive shaft may be used instead of the chain 15 connecting the transmission 14 to the rear wheel 3, and the rotation number of the drive shaft may be used instead of the engine speed Ne. These rotation numbers change rapidly upon the rear wheel 3 starting spinning. In other words, the rotation numbers are values that vary according to the spin amount of the drive wheel 3.

Whether or not to execute driving power suppressing control for a cylinder in which its ignition timing is reached in Y-th (Y: arbitrary number) order after start of the control is decided according to the predetermined control rule (repeating of the pattern). A total number X of expansion strokes included in the pattern is not limited to five, but may be three or less, or six or more, so long as the total number X of expansion strokes in each pattern satisfies X≠N when a total number of the cylinders is N. To be more specific, preferably, X is not divisor of N (X/N≠natural number) and not a multiple (N*X≠natural number). With the setting of X, it is possible to prevent pause of ignition or ignition retard from occurring frequently in the same cylinder.

The pattern is set such that the ignition control for suppressing the driving power may be performed at least once. In other words, the pattern includes an operation in which the driving power suppressing control is performed once or more and an operation in which the driving power maintaining control is performed once or more. Preferably, the driving power suppressing control is performed for a cylinder in which its ignition timing is reached in 1st order after start of the traction control.

Although in Embodiment 2 to Embodiment 6, the control rule is selected according to the monitored spin value M, switching may be performed between a starting point of the control and an ending point of the control in such a manner that the reduction amount of the driving power is increased gradually to a desired amount upon the start of the traction control and the reduction amount of the driving power is decreased gradually to zero just before the end of the traction control.

Although in Embodiment 2-6, the catalyst is disposed inside the muffler 52, it may be disposed within the exhaust pipe 51. Since a temperature rise in a portion of the exhaust pipe 51 which is upstream and downstream of the catalyst can be prevented, a temperature rise in the portion of the exhaust pipe 51 which is upstream and downstream of the catalyst and a temperature rise in its surrounding components can be suppressed.

In Embodiment 2-Embodiment 6, it is preferable that the ignition traction control process is performed with priority over the flow rate traction control process, in the engine control. The flow rate traction control process may be omitted. Although only the flow rate traction control process is performed in steps S34 and S43, both of the flow rate traction control process and the ignition traction control process may be performed in step S34.

Although in Embodiment 2-Embodiment 6, after the ignition control process is performed once according to the ignition skip pattern, it is determined whether or not the condition is met again, the process may return to step S42 if other conditions are met and it may be determined whether or not the condition is met again. For example, if the ignition skip pattern is repeated a predetermined number of times such as twice or more, or after a specified time lapses after start of the control, or after the motorcycle 1 has driven over a specified distance, the process may return to step S42.

Although in Embodiment 2-Embodiment 6, the traction control systems 18A-18E are incorporated into the motorcycle 1, the present invention is not limited to the motorcycle 1. For example, the traction control systems 18A-18E may be incorporated into vehicles such as all terrain vehicle (ATV) or four-wheeled vehicle. The traction control systems 18A-18E may be incorporated into vehicles configured to execute ignition control for each cylinder, and to vehicles which do not include valve actuators of the throttle valves and do not execute air-intake control. Moreover, the traction control systems 18A-18E may be incorporated into vehicles which do not execute fuel injection control.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A traction control system comprising:
   a detector configured to detect a monitored spin value corresponding to a spin amount of a drive wheel in a vehicle;
   a condition determiner configured to determine whether or not the monitored spin value detected by the detector meets a driving power suppressing condition; and
   a controller configured to execute a traction control for reducing a driving power of the drive wheel based on a determination made by the condition determiner;
   the condition determiner being configured to set the driving power suppressing condition variably based on at least one of a variable parameter relating to a rotation number difference which is variable according to a change rate of a rotation number difference between the drive wheel and a driven wheel, and a variable parameter relating to a rotation of a drive system which is variable according to a change rate of a rotational speed of the drive system for driving the drive wheel.

2. The traction control system according to claim 1, wherein the condition determiner is configured to set the driving power suppressing condition based on a variable parameter relating to an opening degree which is variable according to an opening degree change rate of a throttle valve.

3. The traction control system according to claim 1, wherein the condition determiner is configured to set the driving power suppressing condition based on a variable parameter relating to a vehicle speed which is variable according to a vehicle speed change rate.

4. The traction control system according to claim 1, wherein the condition determiner is configured to set the driving power suppressing condition based on two or more of the variable parameters, and a weight of each of the variable parameters.

5. The traction control system according to claim 4, wherein the condition determiner is configured to weight each of the variable parameters in such a manner that a relationship of weighting of the variable parameters is changed based on a driving state of the vehicle.

6. The traction control system according to claim 1, wherein the condition determiner is configured to determine whether or not the monitored spin value detected by the detector meets a first driving power suppressing condition and a second driving power suppressing condition; and
   the controller is configured to reduce the driving power of the drive wheel to a greater degree when the condition determiner determines that the monitored spin value meets the second driving power suppressing condition than when the condition determiner determines that the monitored spin value meets the first driving power suppressing condition.

7. The traction control system according to claim 1, wherein the condition determiner is configured to determine whether or not the monitored spin value detected by the detector meets a switch determination condition;
   the controller is configured to execute a traction control to reduce the driving power of the drive wheel using a first reducing device, when the condition determiner determines that the monitored spin value does not meet the switch determination condition but meets the driving power suppressing condition; and
   the controller is configured to execute a traction control to reduce the driving power of the drive wheel using a second reducing device which reduces the driving power in a different manner from the first reducing device, when the condition determiner determines that the monitored spin value meets the switch determination condition and the driving power suppressing condition.

8. The traction control system according to claim 1, wherein the condition determiner is configured to determine whether or not the monitored spin value detected by the detector meets a spin condition;

the controller is configured to execute a fraction control for controlling ignition states of a plurality of cylinders in which ignition occurs in a predetermined order to reduce the driving power of the drive wheel when the condition determiner determines that the monitored spin value meets the spin condition, the cylinders whose ignition states are controlled being decided according to a predetermined control rule, in the traction control; and the control rule is set such that the ignition state of the same cylinder is not controlled a predetermined number of times or more in succession.

9. The traction control system according to claim 8, wherein the controller is configured to execute the traction control for controlling the ignition states, initially for a cylinder which is scheduled to perform ignition in a first order just after when the condition determiner determines that the monitored spin value meets the spin condition.

10. The fraction control system according to claim 8, wherein the control rule is set such that a pattern indicating whether or not to control the ignition state for each of expansion strokes is repeated, the expansion strokes being continuous in time series and are less or more than a total number of the cylinders by one or more.

11. The fraction control system according to claim 8, wherein the condition determiner is configured to determine whether or not the monitored spin value meets each of a plurality of predetermined suppressing conditions; and the controller has a plurality of different control rules and is configured to select one of the control rules based on a result of the determination made by the condition determiner.

12. The fraction control system according to claim 8, wherein the controller is configured to cause a fuel injector to reduce next, a fuel injection amount to a cylinder to which a fuel was injected from the fuel injector, when an ignition state of the cylinder has been controlled by the traction control.

13. The fraction control system according to claim 8, wherein the ignition state includes an ignition timing;

the traction control is to shift the ignition timing of the cylinder such that the ignition timing is retarded or put forward to reduce the driving power of the drive wheel; and the controller is configured to increase a shift amount of the ignition timing to a predetermined amount after start of the traction control, then reduce the shift amount from the predetermined amount and terminate the traction control.

14. The fraction control system according to claim 13, wherein the detector is configured to detect a monitored engine value according to an engine state; and the controller is configured to increase or decrease the shift amount of the ignition timing according to the monitored engine value.

15. The fraction control system according to claim 8, wherein the controller is configured to switch to a traction control for controlling an air-intake state of each of the cylinders to reduce the driving power of the drive wheel, when the monitored spin value meets a switch determination condition after start of the traction control for controlling the ignition states of the plurality of cylinders.

16. The fraction control system according to claim 15, wherein the detector is configured to detect a monitored opening degree value corresponding to an opening degree of a throttle valve for controlling an air-intake amount in each of the plurality of cylinders; and the controller is configured to change a closing degree of the throttle valve according to the monitored spin value and the monitored opening degree value to control the air-intake state of each of the plurality of cylinders, after switching to the traction control for controlling the air-intake state of each of the cylinders.

17. A method of suppressing a driving power applied to a drive wheel when a vehicle state meets a predetermined driving power suppressing condition, comprising the steps of:

deriving a monitored spin value corresponding to a spin amount of the drive wheel;

deriving a state-relating value relating to the vehicle state;

setting the driving power suppressing condition variably based on a variable parameter variable according to a change rate of the state-relating value per unit time; and suppressing the driving power applied to the drive wheel when the monitored spin value meets the driving power suppressing condition.

18. The method according to claim 17, wherein the vehicle includes an engine including a plurality of cylinders, the method comprising:

determining whether or not the monitored spin value derived in the step of deriving the monitored spin value meets a predetermined spin condition; and suppressing the driving power applied to the drive wheel by a traction control, when it is determined that the monitored spin value meets the predetermined spin condition in the determination step;

wherein in the step of suppressing the driving power by the traction control, ignition states of the plurality of cylinders are controlled according to a predetermined control rule;

the control rule is set such that a control pattern is repeated, the control pattern including an operation in which a driving power suppressing ignition control for suppressing the driving power is performed once or more and an operation in which a driving power maintaining ignition control for making the driving power more than in the driving power suppressing ignition control is performed once or more; and the number of the driving power maintaining ignition control and the driving power suppressing ignition control in the control pattern is set to a value different from a total number of the cylinders.

19. The traction control system according to claim 1, wherein the driving power suppressing condition is variably set based on a gripping state predicted based on the change rate.

20. The traction control system according to claim 17, wherein the state-relating value is any one of the monitored spin value, an acceleration request value, an opening degree of a throttle valve, a vehicle speed, a rotational speed of a driven wheel, and a bank angle.

* * * * *